US 7,010,470 B2

(12) United States Patent
Kodosky et al.

(10) Patent No.: US 7,010,470 B2
(45) Date of Patent: *Mar. 7, 2006

(54) SYSTEM AND METHOD FOR CONVERTING A GRAPHICAL PROGRAM INCLUDING A STRUCTURE NODE INTO A HARDWARE IMPLEMENTATION

(75) Inventors: Jeffrey L. Kodosky, Austin, TX (US); Hugo Andrade, Austin, TX (US); Brian K. Odom, Pflugerville, TX (US); Cary P. Butler, Austin, TX (US)

(73) Assignee: National Instruments Corporation, Austin, TX (US)

( * ) Notice: Subject to any disclaimer, the term of this patent is extended or adjusted under 35 U.S.C. 154(b) by 604 days.

This patent is subject to a terminal disclaimer.

(21) Appl. No.: 09/788,219

(22) Filed: Feb. 16, 2001

(65) Prior Publication Data

US 2001/0025231 A1  Sep. 27, 2001

Related U.S. Application Data

(63) Continuation of application No. 08/912,427, filed on Aug. 18, 1997, now Pat. No. 6,219,628.

(51) Int. Cl.
*G06F 7/60* (2006.01)
(52) U.S. Cl. .............................. 703/2; 703/22; 702/57; 717/106
(58) Field of Classification Search ............... 703/2, 703/22; 702/119, 57, 123, 127, 119.57; 716/1, 716/16, 17, 18, 3; 717/125; 345/700, 771; 710/104, 35; 712/1
See application file for complete search history.

(56) References Cited

U.S. PATENT DOCUMENTS 4,901,221 A    2/1990  Kodosky et al. ............ 715/771

(Continued)

FOREIGN PATENT DOCUMENTS

DE    42 05 524 A1    8/1992

(Continued)

OTHER PUBLICATIONS

XP0002087124 Xiao-Yu, et al., "Sotware Environment for WASMII: A Data Driven Machine with a Virtual Hardware," Field Programmable Logic Architectures, Synthesis and Applications, 4th International Workshop on Field-Programmable Logic and Applications, FPL '94 Proceedings, Berlin, Germany, 1994.

(Continued)

*Primary Examiner*—Russell Frejd
(74) *Attorney, Agent, or Firm*—Meyertons Hood KIvlin Kowert & Goetzel,PC.; Jeffrey C. Hood

(57) ABSTRACT

A computer-implemented system and method for generating a hardware implementation of graphical code. The method comprises first creating a graphical program. A first portion of the graphical program may optionally be compiled into machine code for execution by a CPU. A second portion of the graphical program is converted into a hardware implementation according to the present invention. The operation of converting the graphical program into a hardware implementation comprises exporting the second portion of the graphical program into a hardware description, wherein the hardware description describes a hardware implementation of the second portion of the graphical program, and then configuring a programmable hardware element utilizing the hardware description to produce a configured hardware element. The configured hardware element thus implements a hardware implementation of the second portion of the graphical program.

47 Claims, 23 Drawing Sheets

U.S. PATENT DOCUMENTS

| | | | |
|---|---|---|---|
| 5,309,556 A | 5/1994 | Sismilich | 345/771 |
| 5,497,498 A | 3/1996 | Taylor | 710/104 |
| 5,535,342 A | 7/1996 | Taylor | 710/315 |
| 5,541,849 A | 7/1996 | Rostoker et al. | 716/18 |
| 5,555,201 A | 9/1996 | Dangelo et al. | 716/1 |
| 5,583,749 A | 12/1996 | Tredennick et al. | 361/790 |
| 5,603,043 A | 2/1997 | Taylor et al. | 712/1 |
| 5,638,299 A | 6/1997 | Miller | 702/127 |
| 5,652,875 A | 7/1997 | Taylor | 716/1 |
| 5,684,980 A | 11/1997 | Casselman | 703/23 |
| 5,732,277 A | 3/1998 | Kodosky et al. | 717/125 |
| 5,737,235 A | 4/1998 | Kean et al. | 716/16 |
| 6,064,409 A | 5/2000 | Thomsen et al. | 345/700 |
| 6,219,628 B1 | 4/2001 | Kodosky et al. | 703/2 |
| 6,226,776 B1 | 5/2001 | Panchul et al. | 716/3 |
| 6,230,307 B1 | 5/2001 | Davis et al. | 716/16 |
| 6,584,601 B1 * | 6/2003 | Kodosky et al. | 716/4 |

FOREIGN PATENT DOCUMENTS

| | | |
|---|---|---|
| DE | 692 32 869 T2 | 9/2003 |
| WO | WO 94 10627 A | 5/1994 |
| WO | WO 94 15311 A | 7/1994 |

OTHER PUBLICATIONS

XP000554820 Edwards, et al., "Software acceleration using programmable hardware devices," IEEE Proceedings: Computers and Digital Techniques, vol. 143, No. 1, Jan. 1996, pp. 55-63.

XP000380758 Lesser, et al, "High Level Synthesis and Generating FPGAs with the BEDROC System," Journal of VLSI Signal Processing, vol. 6, No. 2, Aug. 1993, pp. 191-214.

International Search Report for PCT/US 98/13040 mailed Dec. 22, 1998.

Ade, M; Lauwereins, R; Peperstraete, J.A.; Hardware-Software Codesign with GRAPE, Proceedings of the Sixth IEEE International Workshop on Rapid System Prototyping, pp. 40-47, Jun. 9, 1995.

Lauwereins, R; Engels, M; Ade, M; Peperstraette, J; Grape-II: A System-Level Prototyping Environment for DSP Applications, Computer, vol. 28, Issue 2, pp. 35-43, Feb. 1995.

Lysaght, P; Stockwood, J; A Simulation Tool for Dynamically Reconfigurable Field Programmable Gate Arrays, IEEE Transactions on Very Large Scale Integration Systems, vol. 4, Issue 3, pp. 381-390, Sep. 1996.

De Coster, GRAPE-II: An Introduction [online]. Automatic Control and Computer Architectures Department. Katholieke Universiteit, Leuven, Belguim, Feb. 22, 1996 [retrieved Oct. 6, 1999] Retrieved from the Internet @ http://www.esat.kuleuven.ac.be/acca.

Weban et al., A Software Development System for FPGA-based Data Acquisition Systems, Proceedings of the IEEE Symposium on FPGAs for Custom Computing Machines, pp. 28-37, Apr. 1996.

Petronino et al., An FPGA-based Data Acquisition System for a 95 GHz. W-band Radar, IEEE International Conference on Acoustics, Soeech and Signal Processing, vol. 5, pp. 4105-4108, Apr. 1997.

Boulay et al., A High Throughput Controller for a 256-Channel Cardiac Potential Overlapping System, Canadian Conference on Electrical and Computer Engineering, vol. 1, pp. 539-542, Sep. 1995.

Collamati et al. "Induction Machine stator Fault On-line Diagnosis Based on LabVIEW Enviroment", Mediterranean Electrotechnical Conference, vol. 1, p. 495-498, May 1996.

Spoelder et al., "Virtual Instrumentation: A Survery of Standards and Their Interrelation", Proc. IEEE Instr. and Measurement Tech. Conf., vol. 1, pp. 676-681, May 1997.

Srinivasan et al., "LabVIEW program Design for On-Line Data Acquisition and Predictive Maintenance", Proc. Of the 30th Southeastern Symp. On System Theory, pp. 520-524, Mar. 1998.

Wahidanabanu et al., "Virtual Instrumentation with Graphical Programming for Enhanced Detection and Monitoring of Partial Discharges", Proc. Electrical Insulation Conf. 1997, pp. 291-296, Sep. 1997.

Choosing Block-Diagram Tools for DSP Design, http://www.bdti.com/articles/info—dspmt95blockdiagram.htm, May 9, 2003, pp. 1-7.

Real-Time Workshop for Use with Simulink, User's Guide, May 1994, 229 pages.

Guide to Rapid Prototyping with Simulink, Real-Time Workshop and dSPACE, 1995, 16 pages.

Real-Time Interface to Simulink, RTI 30, User's Guide, 1995, 125 pages.

Kevin J Gorman and Kourosh J. Rahnamai, "Real-Time Data Acquisition and Controls Using MatLAB", 1995, 4 pages.

SPW—MatLAB Co-Simulation Interface Product Data Sheet, 1996, 2 pages.

Signal Processing WorkSystem, MatLAB Interface User's Guide, Oct. 1995, 72 pages.

Alta Group of Cadence Design Systems, Inc., 1995, 34 pages.

Code Generation System Product Data Sheet, 1994, 8 pages.
SPW/CGS Porting Kits Product Data Sheet, Nov. 1994, 2 pages.

MultiProx for SPW Product Data Sheet, Aug. 1994, 4 pages.
DSP ProCoder for SPW Product Data Sheet, Nov. 1994, 4 pages.

Xanalog Corporation Sales Manual, Jan. 1987, 8 pages.
Available XA-1000 Literature and Its Use, 1986, 2 pages.
Xanalog, XA-1000 Programming ICONS, 1986, 26 pages.
Xanalog's CAE System: The Fastest AT Alive, Mass High Tech, vol. 4, No. 22, Aug. 1988, 1 page.

Xanalog The Computer Aided Engineering Workstation Comes to Simulation, Simulation vol. 47, No. 1, Jul. 1986, 3 pages.

Xanalog RT Real Time Analog and Digital I/O, Oct. 1990, 4 pages.

Xanalog/SC+, Sep. 1990, 4 pages.
Xanalog Specializing in Workstations for Continuous Dynamic Simulation, 1987, 24 pages.

Xanalog Real-Time User Guide, 1994, 28 pages.
Lee et al., "Gabriel: A Design Environment for Programmable DSPs", Nov. 7, 1988, 13 pages.

Lee et al., "A Design Tool for Hardware and Software for Multiprocessor DSP Systems", May 1989, 4 pages.

Gabriel 0.7 Overview, 1990, 5 pages.
Joseph T. Buck and Edward A. Lee, "Scheduling Dynamic Dataflow Graphs with Bounded Memory Using the Token Flow Model", http://www.synopsys.com/, 1995, 4 pages.

Edward A. Lee, "Design Methodology for DSP", 1992, 4 pages.

Pino et al, Interface Synthesis in Heterogeneous System-Level DSP Design Tools, May 1996, 4 pages.

Jose Luis Pino, Master's Report, "Software Synthesis for Single-Processor DSP Systems Using Ptolemy", May 1993, 48 pages.

Asawaree Kalavade and Edward A. Lee, "A Hardware-Software Codesign Methodology for DSP Applications", 1993, 12 pages.

Pino et al., "Automatic Code Generation for Heterogeneous Multiprocessors", 1994, 4 pages.

Tool Chest continues to Grow, Electronic Engineering Times, Dec. 15, 1995, 2 pages.

Pino et al., Mapping Multiple Independent Syunchronous dataflow Graphs onto Heterogeneous Multiprocessors, Oct. 1994, 6 pages.

Asawaree Kalavade and Edward A. Lee, Hardware/Software Co-Design Using Ptolemy—A Case Study, Sep. 1992, 18 pages.

Pino et al, "Software Synthesis for DSP Using Ptolemy", 1995, 15 pages.

Vol. 1—Ptolemy 0.7 User's Manual, 1997, 532 pages.

i-Logix Product Overview, 1996, 52 pages.

Press Release, i-Logix Statemate MAGNUM Supports PCs, Jan. 31, 1997, 2 pages.

Press Release, i-Logix Signs Reseller Agreement for Virtual Prototypes, Inc.'s VAPS Product Line, Feb. 11, 1997, 2 pages.

Press Release, "i-Logix Introduces Rhapsody, Object-Oriented analysis, Design and Implementation Tool", Feb. 10, 1997, 2 pages.

Statemate/C Product Overview, 1995, 4 pages.

Press Release, "i-Logix and Integrated Systems Link Statemate Magnum and Matrix AutoCode" Jan. 3, 1997, 2 pages.

Press Release, i-Logix and Wind River unveil Industry's First Rapid Prototyping Solution for Testing Embedded Systems at ESC West in San Jose, Sep. 17, 1996, 3 pages.

Press Release, i-Logix Inc. Endorses Unified Modeling Language, Jan. 16, 1997, 1 page.

Levy, M., "DSP Design Tools Target FPGAs," www.reed-electronics.com/ednmag/archives/1996/062096/13df2.htm, Jun. 20, 1996.

Heimdahl, M.P.E., Keenan, D.J., "Generating Code from Hierarchical State-Based Requirements," Proceedings of IEEE International Symposium on Requirements Engineering (RE'97), Jan. 1997.

Integrated Systems, Inc., "MATRIXx Product Family Technical Specifications," Product Manual, Copyright 1995.

Pauer, E.K., "Multiprocessor System Development for High Peformance Signal Processing Applications," Proceedings of the 1997 IEEE Int. Workshop on Rapid System Prototyping (RSP), Copyright 1997.

Drusinsky, D., "Extended State Diagrams and Reactive Systems," Dr. Dobb's Journal, Oct. 1994.

Ade, M., Lauwereins, R., and Peperstraete, J.A., "Hardware-Software Codesign with GRAPE," Rapid System Prototyping, Proceedings of the Sixth IEEE International Workshop on Rapid System Prototyping (RSP'95), 1995.

Chen, X., Ling, X., Amano, H., "Software Environment for WASMII: a Data Driven Machine with a Virtual Hardware," Proceedings of 4th Workshop on Field-Programmable Logic and Applications (FPL '94), pp. 208-219, Springer Verlag, Sep. 1994.

* cited by examiner

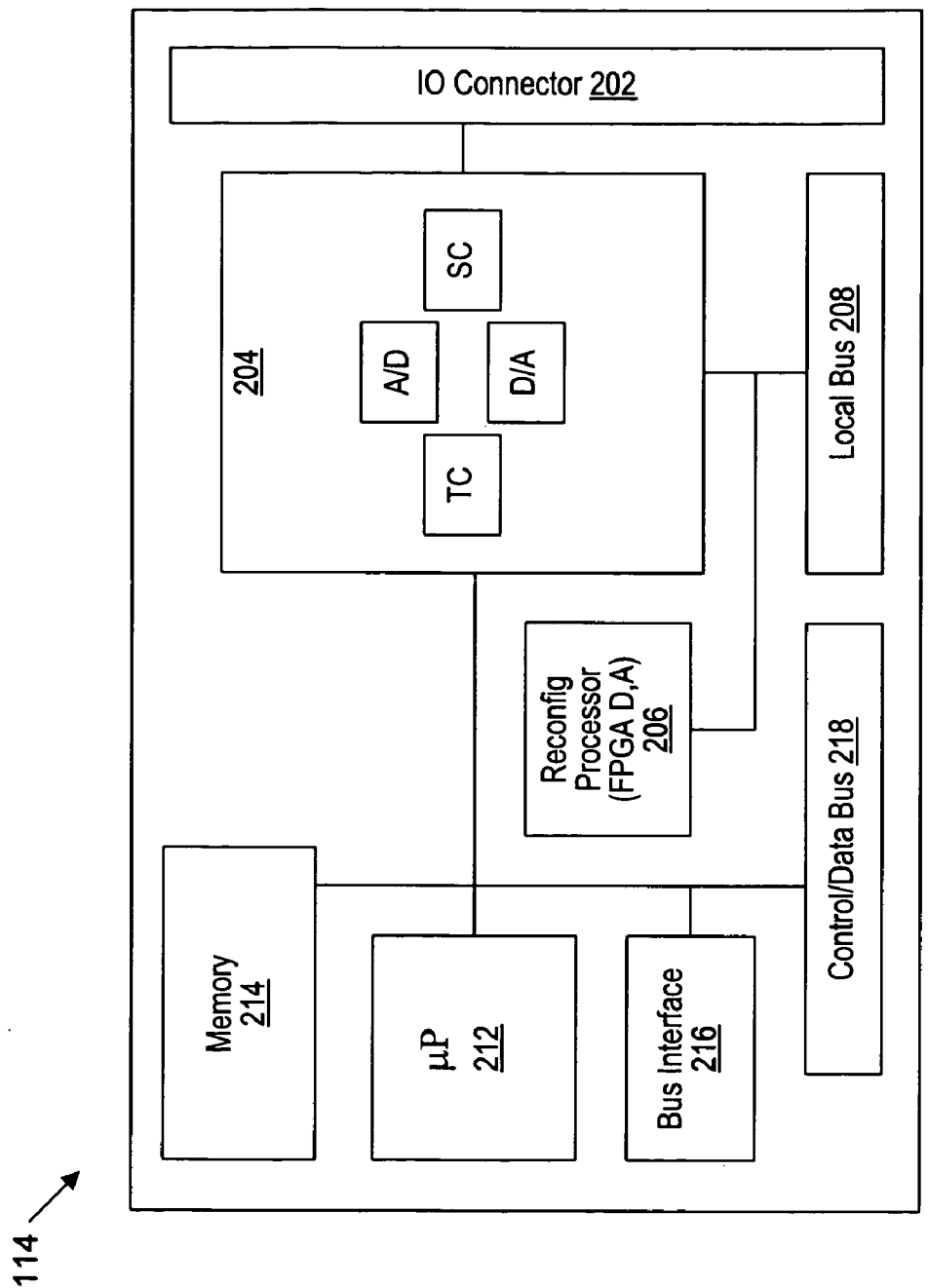

SYSTEM AND METHOD FOR CONVERTING A GRAPHICAL PROGRAM INCLUDING A STRUCTURE NODE INTO A HARDWARE IMPLEMENTATION

CONTINUATION DATA

This application is a continuation of U.S. patent application Ser. No. 08/912,427, filed on Aug. 18, 1997, now U.S. Pat. No. 6,219,628, titled "System and Method for Converting Graphical Programs Into Hardware Implementations", whose inventors are Jeffrey L. Kodosky, Hugo Andrade, Brian Keith Odom and Cary Paul Butler.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and in particular to a system and method for converting a graphical program into a programmable hardware implementation.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e. a graphical programming environment which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places on manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a front panel or user interface panel. The front panel includes various front panel objects, such as controls or indicators that represent the respective input and output that will be used by the graphical program or VI, and may include other icons which represent devices being controlled. When the controls and indicators are created in the front panel, corresponding icons or terminals are automatically created in the block diagram by the block diagram editor. Alternatively, the user can first place terminal icons in the block diagram which cause the display of corresponding front panel objects in the front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

A primary goal of virtual instrumentation is to provide the user the maximum amount of flexibility to create his/her own applications and/or define his/her own instrument functionality. In this regard, it is desirable to extend the level at which the user of instrumentation or industrial automation hardware is able to program instrument. The evolution of the levels at which the user has been able to program an instrument is essentially as follows:

1. User level software (LabVIEW, LabWindows CVI, Visual Basic, etc.)
2. Kernel level software
3. Auxiliary kernel level software (a second kernel running along side the main OS, e.g., InTime, VentureCom, etc.)
4. Embedded kernel level software (U.S. Pat. No. 6,137,438)
5. Hardware level software (FPGA—the present patent application)

In general, going down the above list, the user is able to create software applications which provide a more deterministic real-time response. Currently, most programming development tools for instrumentation or industrial automation provide an interface at level 1 above. In general, most users are unable and/or not allowed to program at the kernel level or auxiliary kernel level. The user level software typically takes the form of software tools that can be used to create software which operates at levels 1 and/or 4.

Current instrumentation solutions at level 5 primarily exist as vendor-defined solutions, i.e., vendor created modules. However, it would be highly desirable to provide the user with the ability to develop user level software which operates at the hardware level. More particularly, it would be desirable to provide the user with the ability to develop high level software, such as graphical programs, which can then be readily converted into hardware level instrument functionality. This would provide the user with the dual benefits of being able to program instrument functionality at the highest level possible (text-based or graphical programs), while also providing the ability to have the created program operate directly in hardware for increased speed and efficiency.

SUMMARY OF THE INVENTION

The present invention comprises a computer-implemented system and method for automatically generating hardware level functionality, e.g., programmable hardware or FPGAs, in response to a graphical program created by a user. This provides the user the ability to develop or define instrument functionality using graphical programming techniques, while enabling the resulting program to operate directly in hardware.

The user first creates a graphical program which performs or represents the desired functionality. The graphical program will typically include one or more modules or a hierarchy of sub-VIs. In the preferred embodiment, the user places various constructs in portions of the graphical program to aid in conversion of these portions into hardware form.

The user then selects an option to convert the graphical program into executable form, wherein at least a portion of the graphical program is converted into a hardware implementation. According to one embodiment of the present invention, the user can select which portions of modules are to be translated into hardware form, either during creation of the graphical program or when selecting the option to convert the graphical program into executable form. Thus the user can select a first portion of the graphical program, preferably comprising the supervisory control and display portion of the program, to be compiled into machine language for execution on a CPU. According to the present invention, the user can select a second portion of the graphical program which is desired for hardware implementation.

The portion of the graphical program selected for hardware implementation is first exported into a hardware description, such as a VHDL description. The hardware description is then converted into a net list, preferably an FPGA-specific net list. The hardware description is converted into a net list by a synthesis tool. The net list is then compiled into a FPGA program file, also called a software bit stream. In the preferred embodiment, the hardware description is directly converted into an FPGA program file.

The step of compiling the resulting net list into an FPGA program file preferably uses a library of pre-compiled function blocks to aid in the compilation, as well as hardware target specific information. The library of pre-compiled function blocks includes net list libraries for structure nodes, such as for/next loops, while/do loops, case structures, and sequence structures, among others. This allows the user to program with high level programming constructs, such as iteration, looping, and case structures, while allowing the resulting program to execute directly in hardware.

The resulting bit stream is then transferred to an FPGA to produce a programmed FPGA equivalent to the graphical program or block diagram.

The preferred embodiment of the invention comprises a general purpose computer system which includes a CPU and memory, and an interface card or device coupled to the computer system which includes programmable hardware or logic, such as an FPGA. The computer system includes a graphical programming system which is used to develop the graphical program. The computer system also includes software according to the present invention which is operable to convert the graphical program into a hardware description. The computer system further includes a synthesis tool which is used to compile the hardware description into an FPGA-specific net list, as well as other tools for converting the net list into an FPGA program file for downloading into the FPGA. The computer system further includes a library of pre-compiled function blocks according to the present invention which are used by the synthesis tool to aid in compiling the net list into the software bit stream.

In one embodiment, the target device including the reconfigurable hardware or FPGA being programmed comprises an interface card in the computer system, such as a data acquisition card, a GPIB interface card, or a VXI interface card. In an alternate embodiment, the target device being programmed comprises an instrument or device connected to the computer, such as through a serial connection. It is noted that the target instrument or device being programmed, which includes an FPGA or other configurable hardware element, can take any of various forms, as desired.

BRIEF DESCRIPTION OF THE DRAWINGS

A better understanding of the present invention can be obtained when the following detailed description of the preferred embodiment is considered in conjunction with the following drawings, in which:

FIGS. 3, 3A and 3B are block diagrams illustrating an interface card configured with programmable hardware according to various embodiments of the present invention;

FIGS. 15 and 16 illustrate a simple example of operation of the present invention, wherein FIG. 15 illustrates a simple graphical program and FIG. 16 is a conceptual diagram of the hardware description of the graphical program of FIG. 15; and FIGS. 17–19 illustrate another example of operation of the present invention, wherein FIG. 17 illustrates a graphical program, FIG. 18 illustrates a tree of data structures created in response to the graphical program of FIG. 17, and FIG. 18 is a conceptual diagram of the hardware description of the graphical program of FIG. 17.

Figure 1:
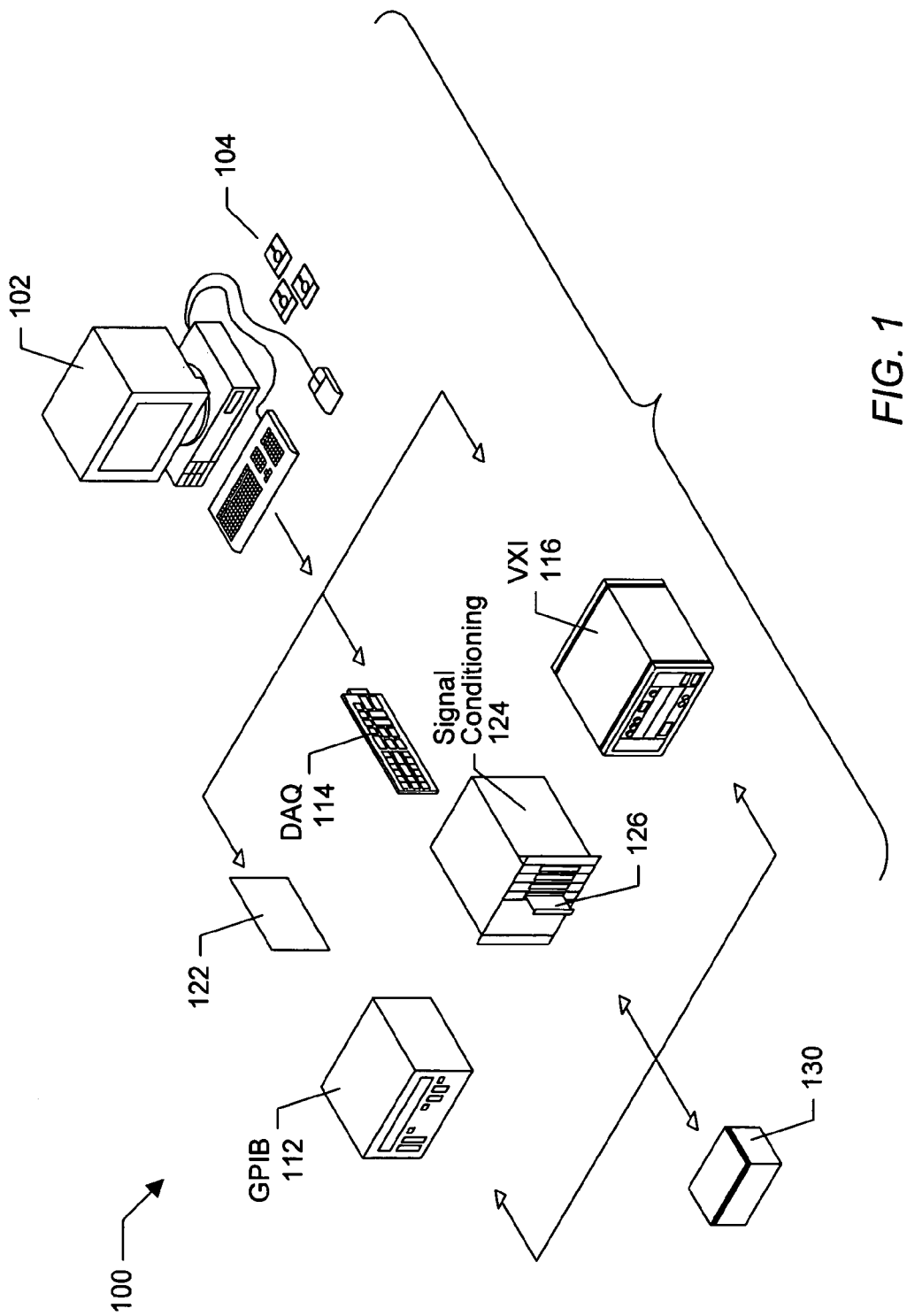
FIG. 1 illustrates an instrumentation control system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative is following within the spirit and scope of the present invention as defined by the appended claims.

DETAILED DESCRIPTION OF THE PREFERRED EMBODIMENT

Incorporation by Reference

The following U.S. Patents and patent applications are hereby incorporated by reference in their entirety as though fully and completely set forth herein.

U.S. Pat. No. 4,901,221 titled "Graphical System for Modeling a Process and Associated Method," issued on Feb. 13, 1990.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 5,734,863 filed Aug. 17, 1994, titled "Method and Apparatus for Providing Improved Type Compatibility and Data Structure Organization in a Graphical Data Flow Diagram".

U.S. Pat. No. 5,475,851 titled "Method and Apparatus for Improved Local and Global Variable Capabilities in a Graphical Data Flow Program".

U.S. Pat. No. 5,497,500 titled "Method and Apparatus for More Efficient Function Synchronization in a Data Flow Program".

U.S. Pat. No. 5,821,934 titled "Method and Apparatus for Providing Stricter Data Type Capabilities in a Graphical Data Flow Environment" filed Jun. 7, 1995.

U.S. Pat. No. 5,481,740 titled "Method and Apparatus for Providing Autoprobe Features in a Graphical Data Flow Diagram".

U.S. Pat. No. 5,974,254 titled "System and Method for Detecting Differences in Graphical Programs" filed Jun. 6, 1997, whose inventor is Ray Hsu.

U.S. Pat. No. 6,173,438 titled "Embedded Graphical Programming System" filed Aug. 18, 1997, whose inventors are Jeffrey L. Kodosky, Darshan Shah, Samson DeKey, and Steve Rogers.

The above-referenced patents and patent applications disclose various aspects of the LabVIEW graphical programming and development system.

The LabVIEW and BridgeVIEW graphical programming manuals, including the "G Programming Reference Manual", available from National Instruments Corporation, are also hereby incorporated by reference in their entirety.

Appendices

The source code appendices comprised in U.S. patent application Ser. No. 08/912,427 filed on Aug. 18, 1997 titled "System and Method for Converting Graphical Programs Into Hardware Implementations", whose inventors are Jeffrey L. Kodosky, Hugo Andrade, Brian Keith Odom and Cary Paul Butler, are hereby incorporated by reference as though fully and completely set forth herein.

Figure 1A:
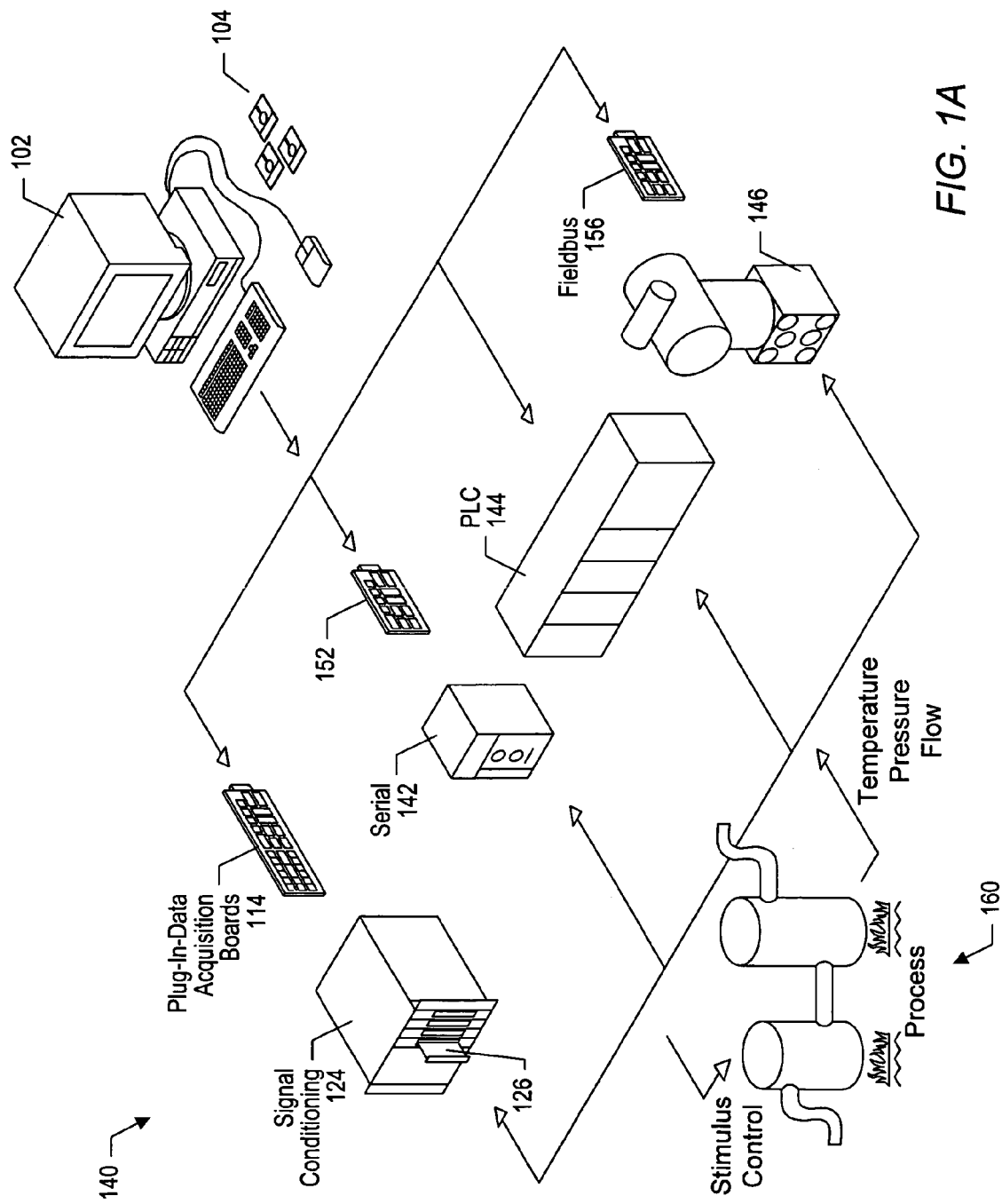
FIG. 1A illustrates an industrial automation system.

FIGS. 1 and 1A—Instrumentation and Industrial Automation Systems

Referring now to FIG. 1, an instrumentation control system 100 is shown. The system 100 comprises a computer 102 which connects to one or more instruments. The computer 102 comprises a CPU, a display screen, memory, and one or more input devices such as a mouse or keyboard as shown. The computer 102 connects through the one or more instruments to analyze, measure or control a unit under test (UUT) or process 130.

The one or more instruments may include a GPIB instrument 112, a data acquisition board 114, and/or a VXI instrument 116. The GPIB instrument 112 is coupled to the computer 102 via a GPIB interface card 122 provided by the computer 102. The data acquisition board 114 is coupled to the computer 102, and preferably interfaces through signal conditioning circuitry 124 to the UUT. The signal conditioning circuitry 124 preferably comprises an SCXI (Signal Conditioning extensions for Instrumentation) chassis comprising one or more SCXI modules 126. Both the GPIB card 122 and the DAQ card 114 are typically plugged in to an I/O slot in the computer 102, such as a PCI bus slot, a PC Card slot, or an ISA, EISA or MicroChannel bus slot provided by the computer 102. However, these cards 122 and 114 are shown external to computer 102 for illustrative purposes. The VXI instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown) comprised in the computer. A serial instrument (not shown) may also be coupled to the computer 102 through a serial port, such as an RS-232 port, USB Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

In the embodiment of FIG. 1, one or more of the devices connected to the computer 102 include programmable or reconfigurable hardware according to the present invention. For example, one or more of the GPIB card 122, the DAQ card 114, or the VXI card include programmable hardware according to the present invention. Alternatively, or in addition, one or more of the GPIB instrument 112, the VXI instrument 116, or the serial instrument include programmable hardware according to the present invention. In the preferred embodiment, the programmable hardware comprises an FPGA (field programmable gate array).

The instruments are coupled to the unit under test (UUT) or process 130, or are coupled to receive field signals, typically generated by transducers. The system 100 may be used in a data acquisition and control application, in a test and measurement application, a process control application, or a man-machine interface application.

Referring now to FIG. 1A, an industrial automation system 140 is shown. The industrial automation system 140 is similar to the instrumentation or test and measurement system 100 shown in FIG. 1. Elements which are similar or identical to elements in FIG. 1 have the same reference numerals for convenience. The system 140 comprises a computer 102 which connects to one or more devices or instruments. The computer 102 comprises a CPU, a display screen, memory, and one or more input devices such as a mouse or keyboard as shown. The computer 102 connects through the one or more devices to a process or device 160 to perform an automation function, such as MMI (Man Machine Interface), SCADA (Supervisory Control and Data Acquisition), portable or distributed acquisition, advanced analysis, or control.

The one or more devices may include a data acquisition board 114, a serial instrument 142, a PLC (Programmable Logic Controller) 144, or a fieldbus network card 156. The data acquisition board 114 is coupled to or comprised in the computer 102, and preferably interfaces through signal conditioning circuitry 124 to the process 160. The signal conditioning circuitry 124 preferably comprises an SCXI (Signal Conditioning extensions for Instrumentation) chassis comprising one or more SCXI modules 126. The serial instrument 142 is coupled to the computer 102 through a serial interface card 152, or through a serial port, such as an RS-232 port, provided by the computer 102. The PLC 144 couples to the computer 102 through a serial port, Ethernet port, or a proprietary interface. The fieldbus interface card 156 is preferably comprised in the computer 102 and interfaces through a fieldbus network to one or more fieldbus devices, such as valve 146. Each of the DAQ card 114, the serial card 152 and the fieldbus card 156 are typically plugged in to an I/O slot in the computer 102 as described above. However, these cards 114, 12 and 156 are shown external to computer 102 for illustrative purposes. In typical industrial automation systems a device will not be present of each interface type, and in fact many systems may only have one or more devices of a single interface type, such as only PLCs. The devices are coupled to the device or process 160.

In the embodiment of FIG. 1A, one or more of the devices connected to the computer 102 include programmable hardware according to the present invention. For example, one or more of the data acquisition board 114, the serial instrument 142, the serial interface card 152, the PLC 144, or the fieldbus network card 156 include programmable hardware according to the present invention. In the preferred embodiment, the programmable hardware comprises an FPGA (field programmable gate array).

Referring again to FIGS. 1 and 1A, the computer 102 preferably includes a memory media, such as a magnetic media, CD-ROM, or floppy disks 104. The memory media preferably stores a graphical programming development system for developing graphical programs. The memory media also stores computer programs according to the present invention which are executable to convert at least a portion of a graphical program into a form for configuring or programming the programmable hardware or FPGA. The present invention includes a software program stored on a memory and/or hard drive of the computer 102 and executed by a CPU of the computer 102. The CPU executing code and data from the memory thus comprises a means for converting graphical code into a hardware implementation according to the steps described below.

The instruments or devices in FIGS. 1 and 1A are controlled by graphical software programs, optionally a portion of which execute on the CPU of the computer 102, and at least a portion of which are downloaded to the programmable hardware for hardware execution. The graphical software programs which perform data acquisition, analysis and/or presentation, e.g., for instrumentation control or industrial automation, are referred to as virtual instruments.

In the preferred embodiment, the present invention is comprised in the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programming system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, GFS DiaDem, and ObjectBench by SES (Scientific and Engineering Software), among others.

Although in the preferred embodiment the graphical programs and programmable hardware are involved with data acquisition/generation, analysis, and/or display, and for controlling or modeling instrumentation or industrial automation hardware, it is noted that the present invention can be used to create hardware implementations of graphical programs for a plethora of applications and are not limited to instrumentation or industrial automation applications. In other words, FIGS. 1 and 1A are exemplary only, and the present invention may be used in any of various types of systems. Thus, the system and method of the present invention is operable for automatically creating hardware implementations of graphical programs or graphical code for any of various types of applications, including general purpose software applications such as word processing, spreadsheets, network control, games, etc.

Computer Block Diagram

Figure 2:
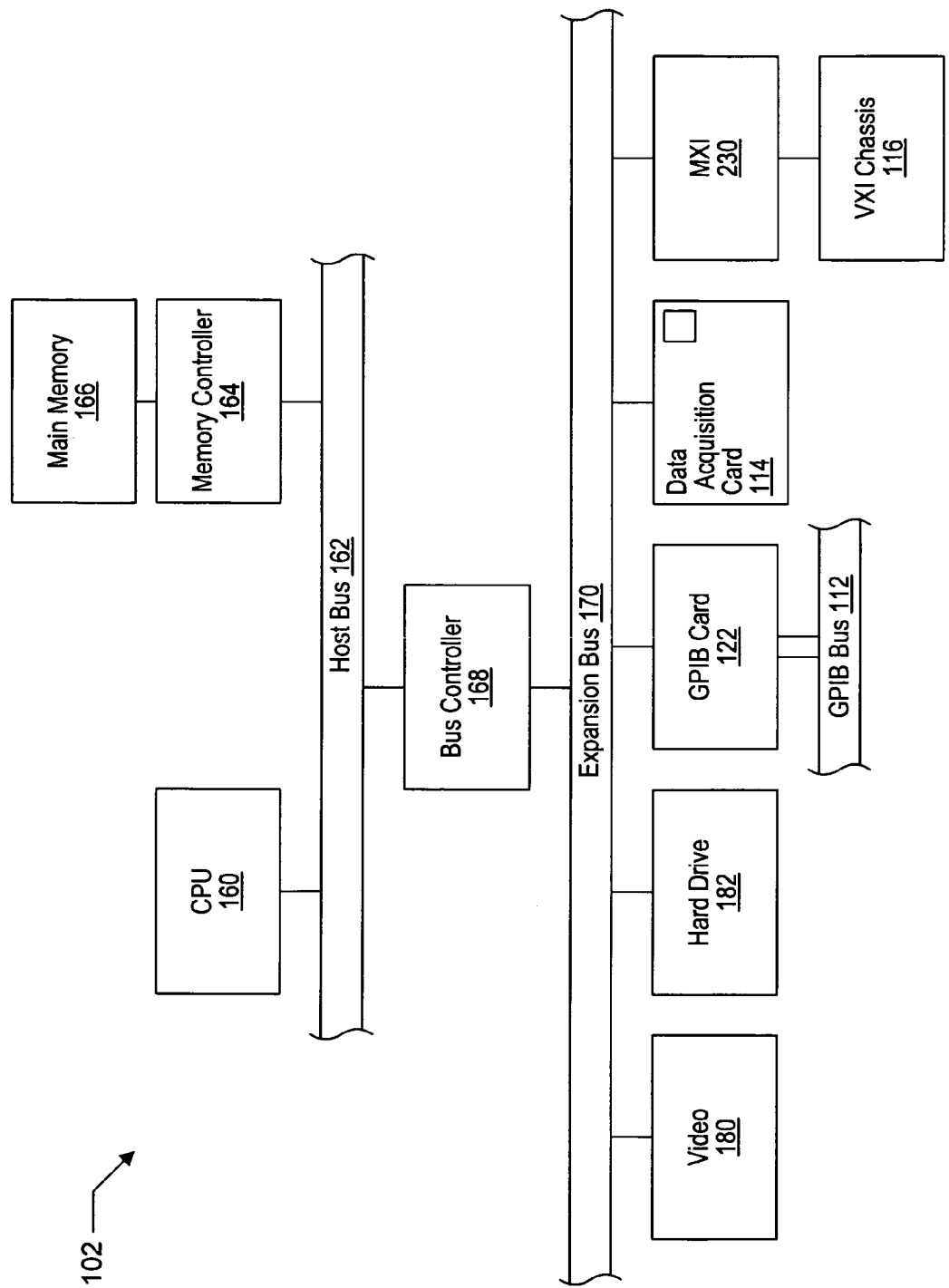
FIG. 2 is a block diagram of the instrumentation control system of FIG. 1.

Referring now to FIG. 2, a block diagram of the computer 102 (of FIG. 1) is shown. The elements of a computer not necessary to understand the operation of the present invention have been omitted for simplicity. The computer 102 includes at least one central processing unit or CPU 160 which is coupled to a processor or host bus 162. The CPU 160 may be any of various types, including an x86 processor, a PowerPC processor, a CPU from the Motorola family of processors, a CPU from the SPARC family of RISC processors, as well as others. Main memory 166 is coupled to the host bus 162 by means of memory controller 164. The main memory 166 stores a graphical programming system, and also stores software for converting at least a portion of a graphical program into a hardware implementation. This software will be discussed in more detail below. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be s used. The expansion bus 170 includes slots for various devices such as the data acquisition board 114 (of FIG. 1), a GPIB interface card 122 which provides a GPIB bus interface to the GPIB instrument 112 (of FIG. 1), and a VXI or MXI bus card 230 coupled to the VXI chassis 116 for receiving VXI instruments. The computer 102 further comprises a video display subsystem 180 and hard drive 182 coupled to the expansion bus 170.

One or more of the interface cards or devices coupled to the expansion bus, such as the DAQ card 114, the GPIB interface card 122, the GPIB instrument 112, or the VXI or MXI bus card 230 comprises an embedded system comprising an embedded CPU and embedded memory.

Programmable Hardware Diagram

Referring now to FIG. 3, a block diagram illustrating an interface card configured with programmable hardware according to the present invention is shown. It is noted that FIG. 3 is exemplary only, and an interface card or device configured with programmable hardware according to the present invention may have various architectures or forms, as desired. The interface card illustrated in FIG. 3 is the DAQ interface card 114 shown in either of FIG. 1 or 1A. However, as noted above, the programmable hardware may be included on any of the various devices shown in FIG. 1 or 1A, or on other devices, as desired.

As shown, the interface card 114 includes an I/O connector 202 which is coupled for receiving signals. In the embodiments of FIGS. 1 and 1A, the I/O connector 202 presents analog and/or digital connections for receiving/providing analog or digital signals. The I/O connector 202 is adapted for coupling to SCXI conditioning logic 124 and 126, or is adapted to be coupled directly to a unit under test 130 or process 160.

The interface card 114 also includes data acquisition (DAQ) logic 204. As shown, the data acquisition logic 204 comprises analog to digital (A/D) converters, digital to analog (D/A) converters, timer counters (TC) and signal conditioning (SC) logic as shown. The DAQ logic 204 provides the data acquisition functionality of the DAQ card 114.

According to the preferred embodiment of the invention, the interface card 114 includes a programmable hardware element or programmable processor 206. In the preferred embodiment, the programmable hardware 206 comprises a field programmable gate array (FPGA) such as those available from Xilinx, Altera, etc. The programmable hardware element 206 is coupled to the DAQ logic 204 and is also coupled to the local bus interface 208. Thus a graphical program can be created on the computer 102, or on another computer in a networked system, and at least a portion of the graphical program can be converted into a hardware implementation form for execution in the FPGA 206. The portion of the graphical program converted into a hardware implementation form is preferably a portion which requires fast and/or real-time execution.

In the embodiment of FIG. 3, the interface card 114 further includes a dedicated on-board microprocessor 212 and memory 214. This enables a portion of the graphical program to be compiled into machine language for storage in the memory 214 and execution by the microprocessor 212. This is in addition to a portion of the graphical program being converted into a hardware implementation form in the FPGA 206. Thus, in one embodiment, after a graphical program has been created, a portion of the graphical program is compiled for execution on the embedded CPU 212 and executes locally on the interface card 114 via the CPU 212 and memory 214, and a second portion of the graphical program is translated or converted into a hardware executable format and downloaded to the FPGA 206 for hardware implementation.

As shown, the interface card 114 further includes bus interface logic 216 and a control/data bus 218. In the preferred embodiment, the interface card 114 is a PCI bus-compliant interface card adapted for coupling to the PCI bus of the host computer 102, or adapted for coupling to a PXI (PCI eXtensions for Instrumentation) bus. The bus interface logic 216 and the control/data bus 218 thus present a PCI or PXI interface.

The interface card 114 also includes local bus interface logic 208. In the preferred embodiment, the local bus interface logic 208 presents a RTSI (Real Time System Integration) bus for routing timing and trigger signals between the interface card 114 and one or more other devices or cards.

Figure 3A:
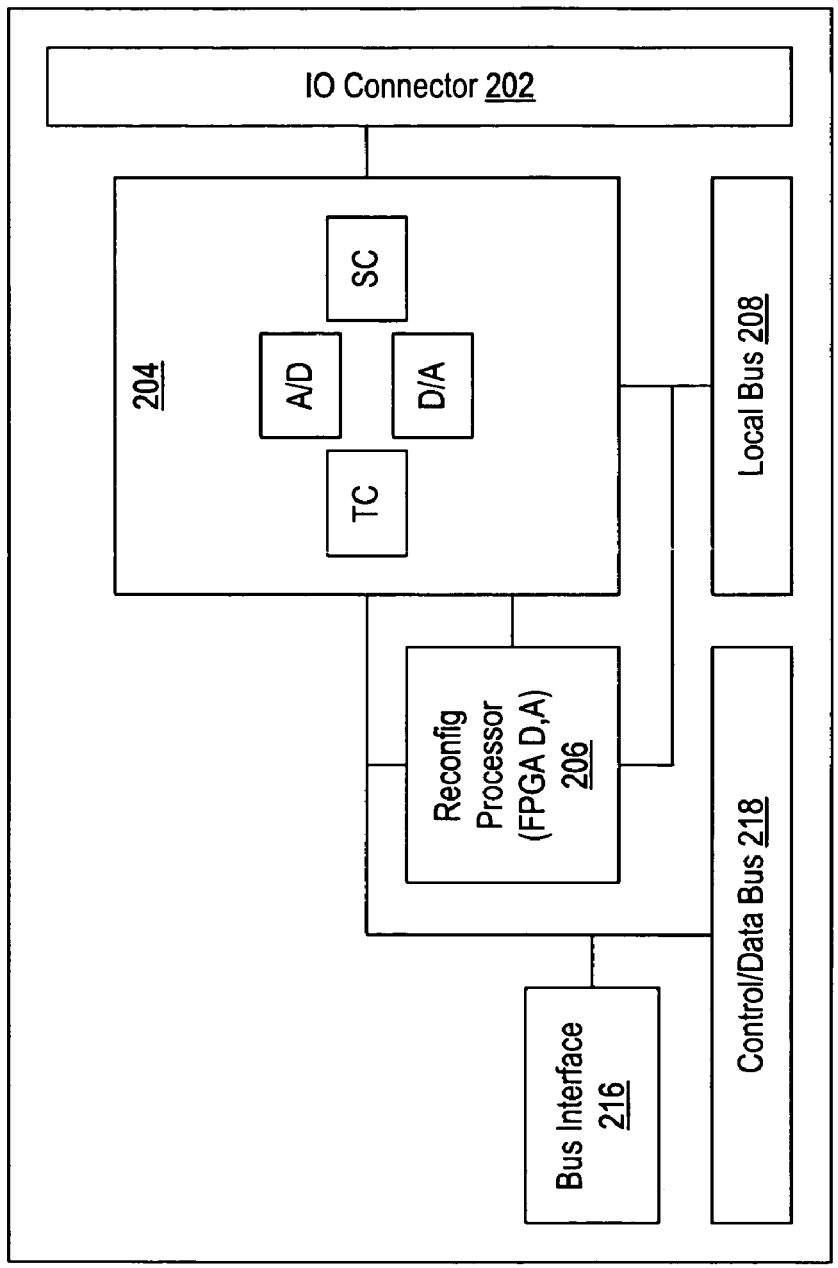

In the embodiment of FIG. 3A, the CPU 212 and memory 214 are not included on the interface card 114, and thus only the portion of the graphical program which is converted into hardware implementation form is downloaded to the FPGA 206. Thus in the embodiment of FIG. 3A, any supervisory control portion of the graphical program which is necessary or desired to execute in machine language on a programmable CPU is executed by the host CPU in the computer system 102, and is not executed locally by a CPU on the interface card 114.

Figure 3B:
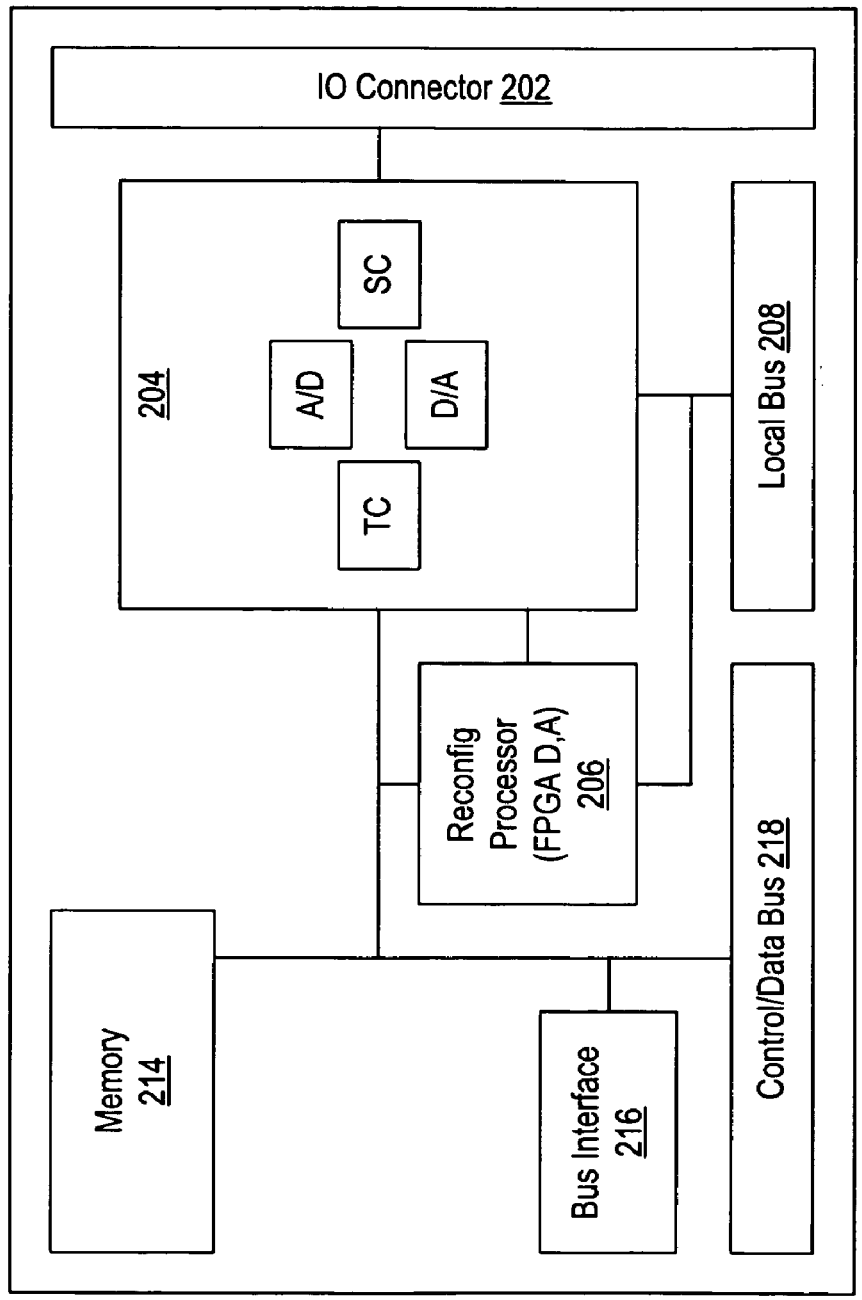

In the embodiment of FIG. 3B, the CPU 212 is not included on the interface card 114, i.e., the interface card 114 includes the FPGA 206 and the memory 214. In this embodiment, the memory 214 is used for storing FPGA state information. FIG. 3B is the currently preferred embodiment of the present invention.

Figure 4:
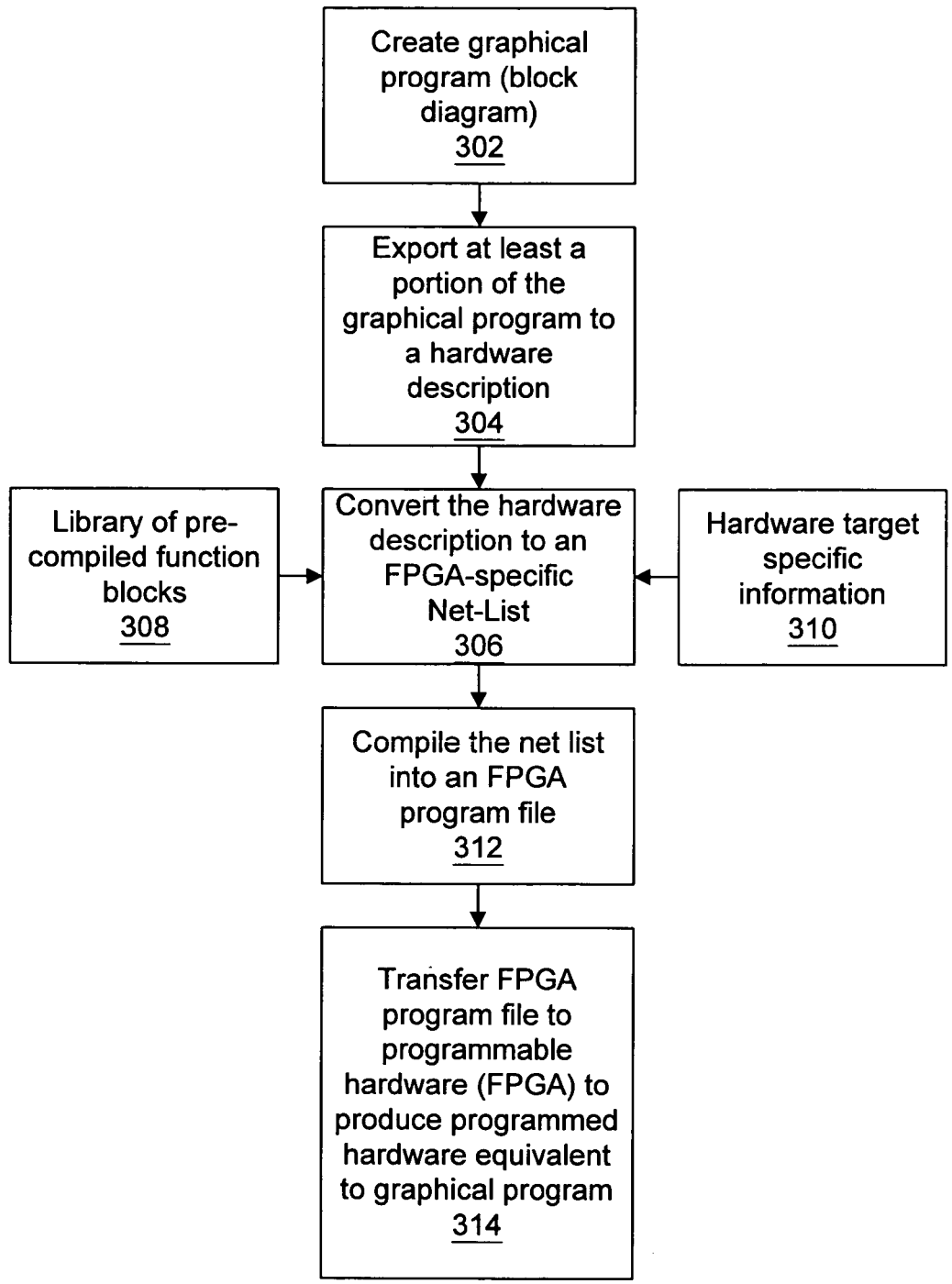
FIG. 4 is a flowchart diagram illustrating operation of the present invention.

FIG. 4—Conversion of Graphical Code into a Hardware Implementation

Referring now to FIG. 4, a flowchart diagram is shown illustrating operation of the preferred embodiment of the present invention. The present invention comprises a computer-implemented method for generating hardware implementations of graphical programs or graphical code. It is noted that various of the steps in the flowcharts below can occur concurrently or in different orders.

The method below presumes that a graphical programming development system is stored in the memory of the computer system for creation of graphical programs. In the preferred embodiment, the graphical programming system is the LabVIEW graphical programming system available from National Instruments. In this system, the user creates the graphical program in a graphical program panel, referred to as a block diagram window and also creates a user interface in a graphical front panel. The graphical program is sometimes referred to as a virtual instrument (VI). The graphical program or VI will typically have a hierarchy of sub-graphical programs or sub-VIs.

As shown, in step 302 the user first creates a graphical program, also sometimes referred to as a block diagram. In the preferred embodiment, the graphical program comprises a graphical data flow diagram which specifies functionality of the program to be performed. This graphical data flow diagram is preferably directly compilable into machine language code for execution on a computer system.

In step 304 the method operates to export at least a portion of the graphical program to a hardware description. Thus, after the user has created a graphical program in step 302, the user selects an option to export a portion of the graphical program to a hardware description. The hardware description is preferably a VHDL description, e.g., a VHDL source file, or alternatively is a high level net list description. The hardware description comprises a high level hardware description of function blocks, logic, inputs, and outputs which perform the operation indicated by the graphical program. The operation of exporting at least a portion of a the graphical program to a hardware description is discussed in more detail with the flowchart of FIG. 6.

In one embodiment, during creation of the graphical program in step 302 the user specifies portions, e.g. sub VIs, which are to be exported to the hardware description format for conversion into hardware implementation. In another embodiment, when the user selects the option to export a portion of the graphical program to the hardware description format, the user selects which modules or sub-VIs at that time which are to be exported to the hardware description.

In step 306 the method operates to convert the hardware description into an FPGA-specific net list. The net list describes the components required to be present in the hardware as well as their interconnections. Conversion of the hardware description into the FPGA-specific net list is preferably performed by any of various types of commercially available synthesis tools, such as those available from Xilinx, Altera, etc.

In the preferred embodiment, the converting step 306 may utilize one or more pre-compiled function blocks from a library of pre-compiled function blocks 308. Thus, for certain function blocks which are difficult to compile, or less efficient to compile, from a hardware description into a net list format, the hardware description created in step 304 includes a reference to a pre-compiled function block from the library 308. The respective pre-compiled function blocks are simply inserted into the net list in place of these references in step 306. The preferred embodiment of the invention thus includes the library 308 of pre-compiled function blocks which are used in creating the net list. The preferred embodiment also includes hardware target specific information 310 which is used by step 306 in converting the hardware description into a net list which is specific to a certain type or class of FPGA.

In step 312 the method operates to compile the net list into an FPGA program file, also referred to as a software bit stream. The FPGA program file is a file that can be readily downloaded to program an FPGA.

After the net list has been compiled into an FPGA program file in step 312, then in step 314 the method operates to transfer the FPGA program file to the programmable hardware, e.g., the FPGA, to produce a programmed hardware equivalent to the graphical program. Thus, upon completion of step 314, the portion of a graphical program referenced in step 304 is comprised as a hardware implementation in an FPGA or other programmable hardware element.

It is noted that various of the above steps can be combined and/or can be made to appear invisible to the user. For example, steps 306 and 312 can be combined into a single step, as can steps 304 and 306. In the preferred embodiment, after the user creates the graphical program in step 302, the user simply selects a hardware export option and indicates the hardware target or destination, causing steps 304–314 to be automatically performed.

Figure 4A:
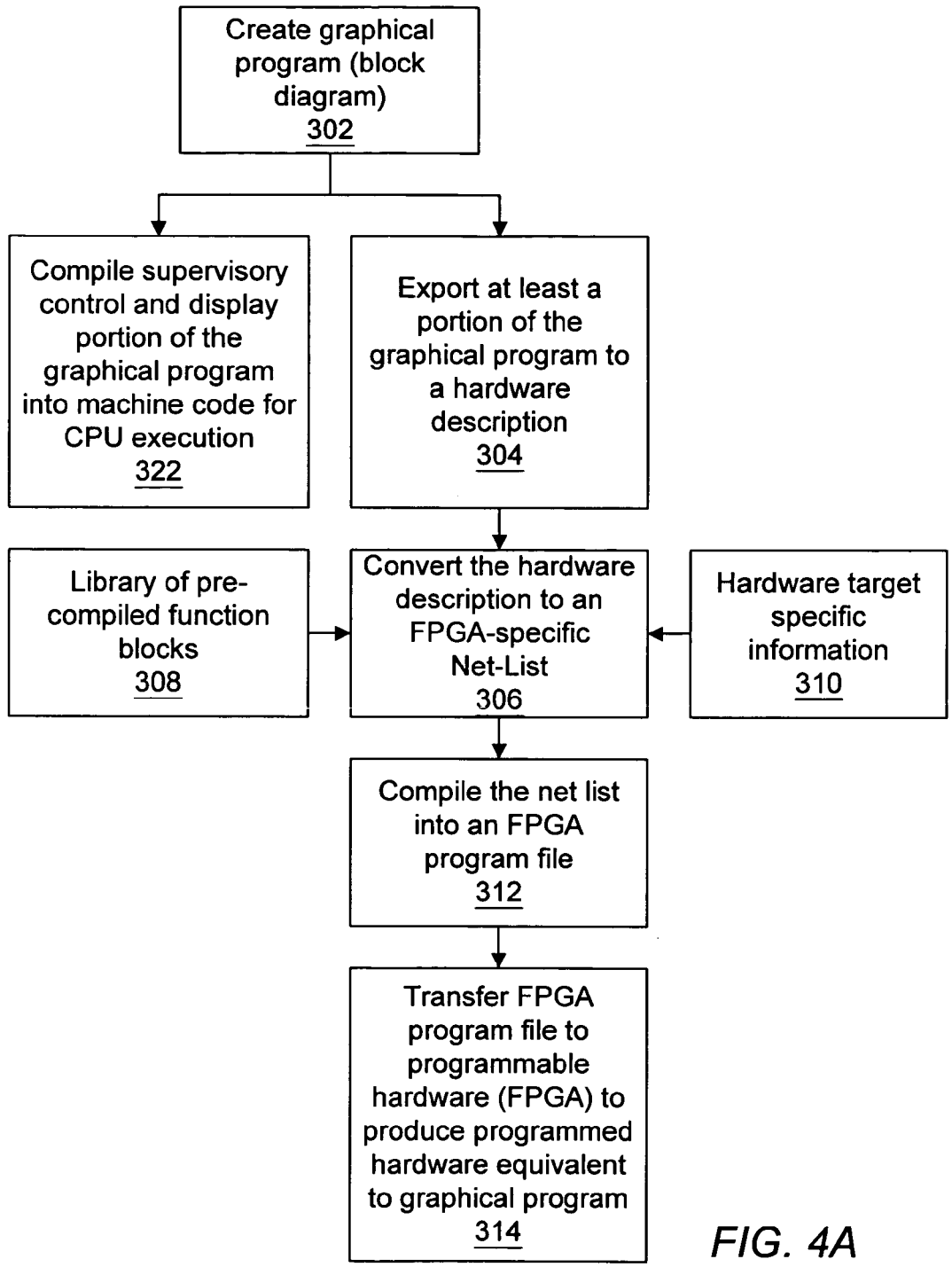
FIG. 4A is a more detailed flowchart diagram illustrating operation of the preferred embodiment of the invention, including compiling a first portion of the graphical program into machine language and converting a second portion of the graphical program into a hardware implementation.

FIG. 4A—Conversion of a Graphical Program into Machine Language and Hardware Implementations FIG. 4A is a more detailed flowchart diagram illustrating operation of the preferred embodiment of the invention, including compiling a first portion of the graphical program into machine language and converting a second portion of the graphical program into a hardware implementation.

As shown in FIG. 4A, after the user has created a graphical program in step 302, the user can optionally select a first portion to be compiled into machine code for CPU execution as is normally done. In the preferred embodiment, the user preferably selects a supervisory control and display portion of the graphical program to be compiled into machine code for a CPU execution. The first portion comprising supervisory control and display portions is compiled for execution on a CPU, such as the host CPU in the computer 102 or the CPU 212 comprised on the interface card 114. This enables the supervisory control and display portions to execute on the host CPU, which is optimal for these elements of the program.

The user selects a second portion for conversion to hardware implementation, which is performed as described above in steps 304–314 of FIG. 4. The portion of the graphical program which is desired for hardware implementation preferably comprises modules or VIs which require a fast or deterministic implementation and/or are desired to execute in a stand-alone hardware unit. In general, portions of the graphical program which are desired to have a faster or more deterministic execution are converted into the hardware implementation. In one embodiment, the entire graphical program is selected for conversion to a hardware implementation, and thus step 322 is not performed.

Figure 5:
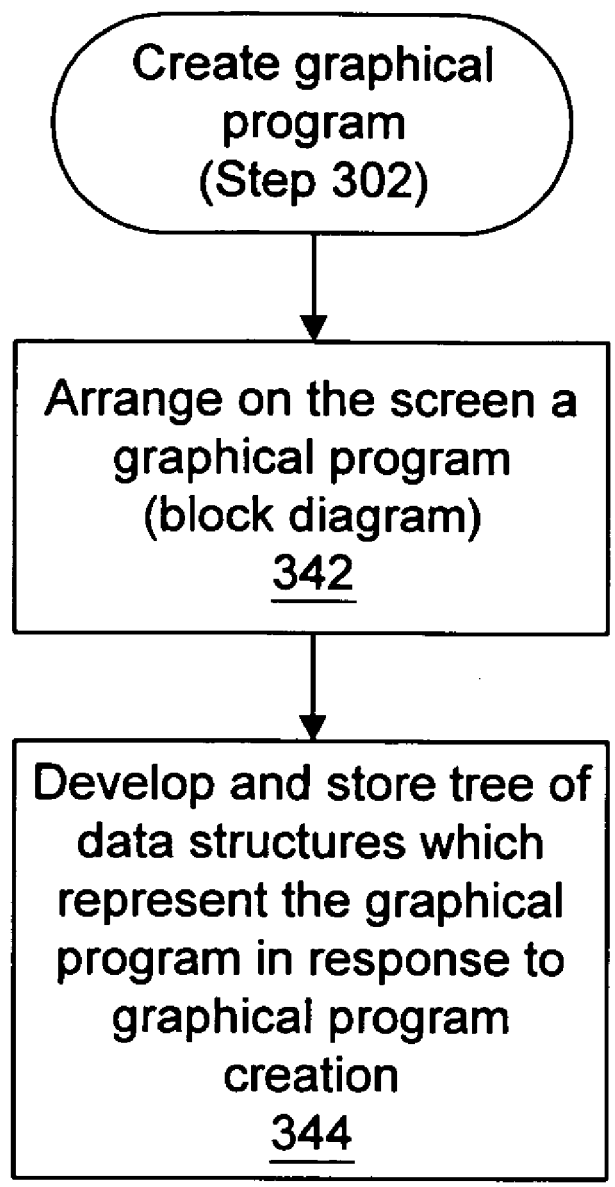
FIG. 5 is a more detailed flowchart diagram illustrating creation of a graphical program according to the preferred embodiment.

FIG. 5—Creation of a Graphical Program

FIG. 5 is a more detailed flowchart diagram of step 302 of FIGS. 4 and 4A, illustrating creation of a graphical program according to the preferred embodiment of the invention. As shown, in step 342 the user arranges on the screen a graphical program or block diagram. This includes the user placing and connecting, e.g., wiring, various icons or nodes on the display screen in order to configure a graphical program. More specifically, the user selects various function icons or other icons and places or drops the icons in a block diagram panel, and then connects or "wires up" the icons to assemble the graphical program. The user also preferably assembles a user interface, referred to as a front panel, comprising controls and indicators which indicate or represent input/output to/from the graphical program. For more information on creating a graphical program in the LabVIEW graphical programming system, please refer to the LabVIEW system available from National Instruments as well as the above patent applications incorporated by reference.

In response to the user arranging on the screen a graphical program, the method operates to develop and store a tree of data structures which represent the graphical program. Thus, as the user places and arranges on the screen function nodes, structure nodes, input/output terminals, and connections or wires, etc., the graphical programming system operates to develop and store a tree of data structures which represent the graphical program. More specifically, as the user assembles each individual node and wire, the graphical programming system operates to develop and store a corresponding data structure in the tree of data structures which represents the individual portion of the graphical program that was assembled. Thus, steps 342 and 344 are an iterative process which are repetitively performed as the user creates the graphical program.

Figure 6:
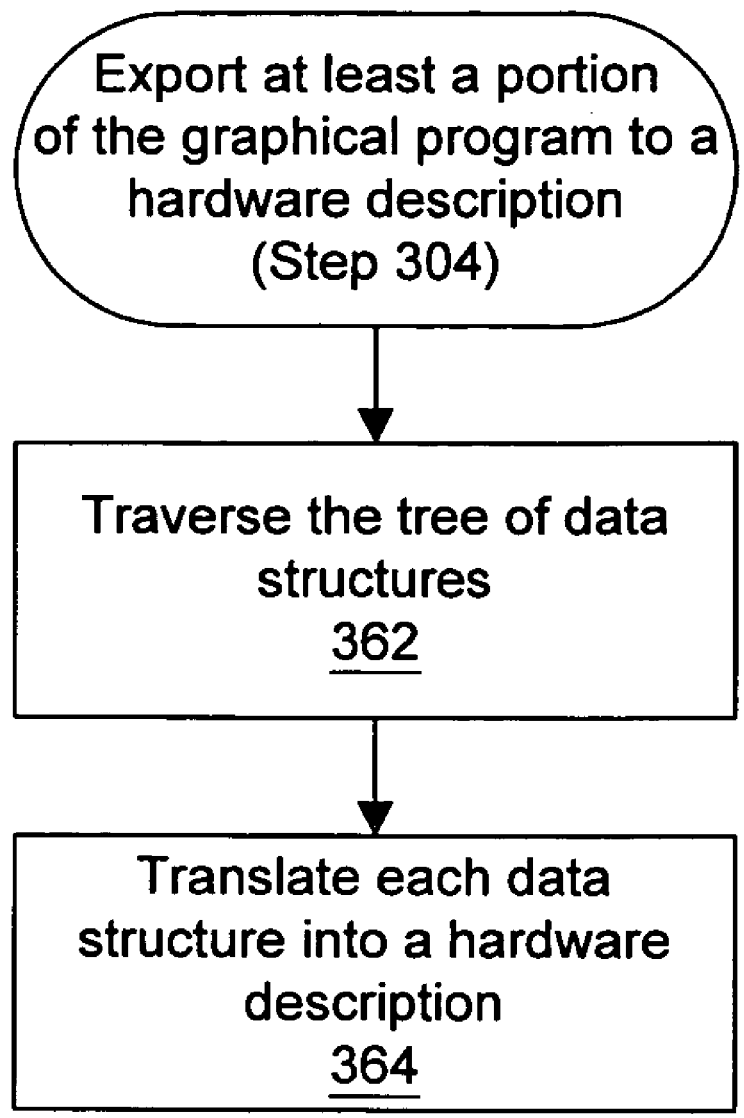
FIG. 6 is a more detailed flowchart diagram illustrating operation of exporting at least a portion of a graphical program to a hardware description.

FIG. 6—Exporting a Portion of the Graphical Program to a Hardware Description

FIG. 6 is a flowchart diagram of step 304 of FIGS. 4 and 4A, illustrating operation when the method exports a portion of the graphical program into a hardware description. The tree of data structures created and stored in step 344 preferably comprises a hierarchical tree of data structures based on the hierarchy and connectivity of the graphical program. As shown, in step 362 the method traverses the tree of data structures and in step 364 the method operates to translate each data structure into a hardware description format. In one embodiment, the method first flattens the tree of data structures prior to traversing the tree in step 362.

In the present embodiment, a number of different function icons and/or primitives can be placed in a diagram or graphical program for conversion into a hardware implementation. These primitives include, but are not limited to, function nodes, constants, global variables, control and indicator terminals, structure nodes, and sub-VIs, etc. Function icons or primitives can be any data type, but in the current embodiment are limited to Integer or Boolean data types. Also, global variables are preferably comprised on a single global panel for convenience. If a VI appears multiple times, then the VI is preferably re-entrant and may have state information. If a VI is not re-entrant, then preferably multiple copies of the VI are created in hardware if the VI has no state information, otherwise it would be an error.

In the preferred embodiment, each node which is converted to a hardware description includes an Enable input, a Clear_Enable signal input, a master clock signal input and an Enable_Out or Done signal. The Enable input guarantees that the node executes at the proper time, i.e., when all of its inputs have been received. The Clear_Enable signal input is used to reset the node if state information remembers that the node was done. The Enable_Out or Done signal is generated when the node completes and is used to enable operation of subsequent nodes which receive an output from the node. Each node which is converted to a hardware description also includes the data paths depicted in the graphical program.

For While loop structures, Iteration structures, Sequence structures, and Case Structures, the respective structure is essentially abstracted to a control circuit or control block. The control block includes a diagram enable out for each sub-diagram and a diagram done input for each sub-diagram.

In addition to the above signals, e.g., the Enable input, the Clear_Enable signal input, the master clock signal input, and the Enable_Out or Done signal, all global variables have numerous additional signals, including CPU interface signals which are specific to the type of CPU and bus, but typically include data lines, address lines, clock, reset and device select signals. All VIs and sub-VIs also include CPU interface signals if they contain a global variable.

In the preferred embodiment, when an icon is defined for a VI used solely to represent a hardware resource connected to the FPGA, e.g., an A/D converter, with a number of inputs and outputs, a string control is preferably placed on the front panel labeled VHDL. In this case, the default text of the string control is placed in the text file created for the VHDL of the VI. Thus, in one embodiment, a library of VIs are provided each representing a physical component or resource available in or to the FPGA. As these VHDL files representing these VIs are used, the method of the present invention monitors their usage to ensure that each hardware resource is used only once in the hierarchy of VIs being exported to the FPGA. When the VHDL file is written, the contents of the string control are used to define the access method of that hardware resource.

The following is pseudo-code which describes the operations performed in the flowchart of FIG. 6:

GenCircuit (vi)
   send GenCircuit to top level diagram of vi
Diagram:GenCircuit(d)
   send GenCircuit to each constant in d
   send GenCircuit to each node in d
   send GenCircuit to each signal in d
Signal: GenCircuit(s)
   declare type of signal s
BasicNode:GenCircuit(n)
   declare type of component needed for n
   declare AND-gate for enabling n (if needed)
   list connections for all node inputs
   list connections for all inputs to enabling AND-gate (if needed)
Constant:GenCircuit(c)
   declare type and value of constant c
WhileLoopNode:GenCircuit(n)
   declare while loop controller component
   declare AND-gate for enabling n (if needed)
   list connections for all node inputs
   list connections for all inputs to enabling AND-gate (if needed)
   declare type of each shift register component
   list connections for all inputs to all shift registers
   declare type of each tunnel component
   list connections for all inputs to all tunnels
CaseSelectNode:GenCircuit (n)
   declare case select controller component
   declare AND-gate for enabling n (if needed)
   list connections for all node inputs
   list connections for all inputs to enabling AND-gate (if needed)
   declare type of each tunnel component
   list connections for all inputs to all tunnels
SequenceNode:GenCircuit (n)
   declare sequence controller component
   declare AND-gate for enabling n (if needed)
   list connections for all node inputs
   list connections for all inputs to enabling AND-gate (if needed)
   declare type of each tunnel component
   list connections for all inputs to all tunnels
SubVINode:GenCircuit (n)
   send GenCircuit to the subVI of n
   associate inputs & outputs of subVI with those of n
   declare AND-gate for enabling n (if needed)
   list connections for all node inputs
   list connections for all inputs to enabling AND-gate (if needed)

Referring to the above pseudo code listing, the method starts at the VI level (the top level) and begins generation of VHDL by sending a message to the top level diagram. The method in turn effectively provides a message from the diagram to each constant, each node, and each signal in the diagram.

For signals, the method then declares the signal type.

For basic nodes, the method declares a type of the component needed, and also declare an AND-gate with the proper number of inputs needed in order to enable itself. In other words, basic nodes declare an AND-gate with a number of inputs corresponding to the number of inputs received by the node. Here, optimization is preferably performed to minimize the number of inputs actually needed. For example, if a node has three inputs, the node does not necessarily need a three input AND-gate if two of those inputs are coming from a single node. As another example, if one input comes from node A and another input comes from node B, but node A also feeds node B, then the input from node A is not needed in the AND gate. Thus various types of optimization are performed to reduce the number of inputs to each AND gate. For the basic node, the method also lists the connections for all of its inputs as well as the connections for all inputs to the enabling AND-gate.

For a constant, the method simply declares the type and the value of the constant.

For a While loop, the method declares a While loop controller component. The method also declares an AND-gate, lists AND-gate inputs, and lists node inputs in a similar manner to the basic node described above. The method then declares the type for each shift register and includes a component for the shift register, and lists all the connections for the shift register inputs. If any tunnels are present on the While loop, the method declares the type of each tunnel component and list the connections for the inputs to the tunnels. For most tunnels, the method simply equivalences the signals for the inside and outside, without any effect.

The method proceeds in a similar manner for Case and Sequence structures. For Case and Sequence structures, the method declares a case select controller component or a sequence controller component, respectively. For both Case and Sequence structures, the method also declares an AND-gate, lists AND-gate inputs, and lists node inputs in a similar manner to the basic node described above. The method then declares the component needed for any tunnels and list the connections for the inputs to the tunnels.

For a sub-VI, the method sends a message to the sub-VI and associates inputs and outputs of the sub-VI with those of n. The method then declares an AND-gate, lists AND-gate inputs, and lists node inputs in a similar manner to the basic node described above.

Figure 7:
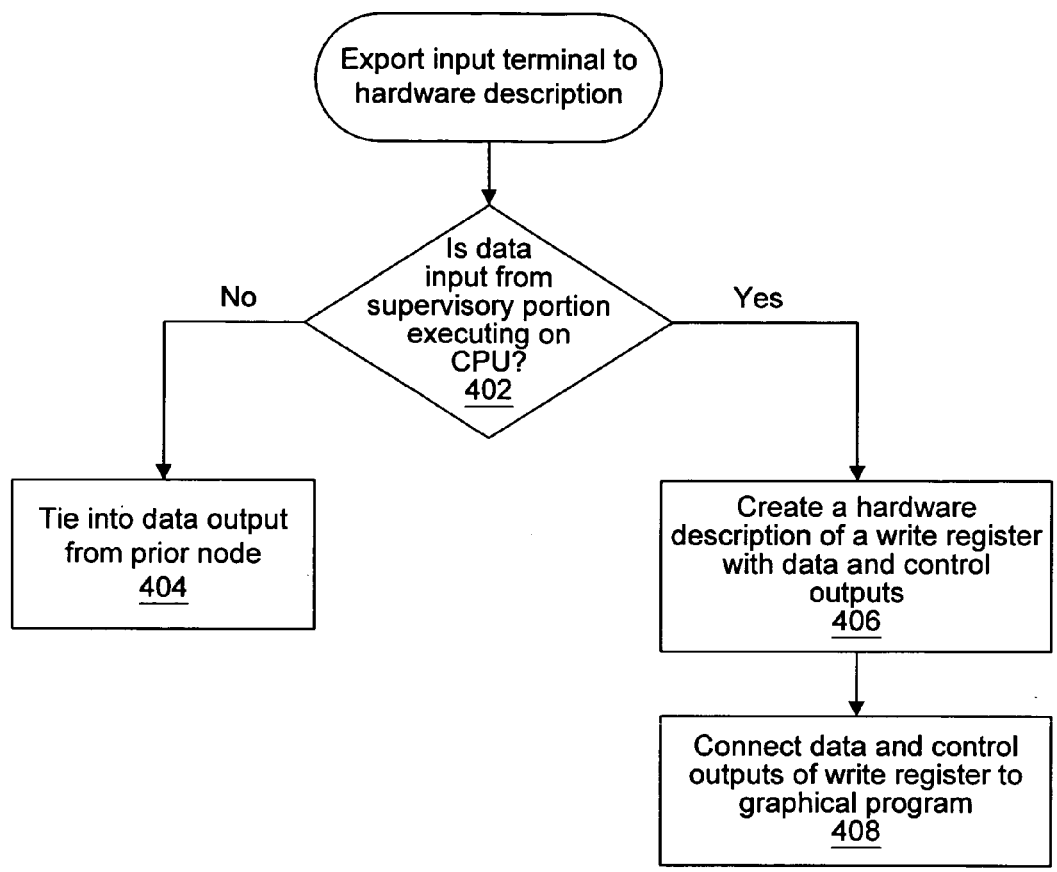
FIG. 7 is a flowchart diagram illustrating operation where the method exports an input terminal into a hardware description.

FIG. 7—Exporting an Input Terminal into a Hardware Description

FIG. 7 is a flowchart diagram illustrating operation when the method exports an input terminal into the hardware description format. As shown, in step 402 the method determines if the data provided to the input terminal is input from a portion of the graphical program which will be executing on the CPU, i.e., the portion of the graphical program which is to be compiled into machine language for execution on the CPU, or whether the data is input from another portion of the graphical program that is also being transformed into a hardware implementation.

As shown, if the data input to the input terminal is determined in step 402 to be input from a portion of the graphical program being compiled for execution on the CPU, in step 406 the method creates a hardware description of a write register with a data input and data and control outputs. The write register is operable to receive data transferred by the host computer, i.e., generated by the compiled portion executing on the CPU. In step 408 the data output of the write register is connected for providing data output to other elements in the graphical program portion. In step 408 the control output of the write register is connected to other elements in the graphical program portion for controlling sequencing of execution, in order to enable the hardware description to have the same or similar execution order as the graphical program.

If the data is determined to not be input from a portion being compiled for execution on the CPU step in 402, i.e., the data is from another node in the portion being converted into a hardware implementation, then in step 404 the method ties the data output from the prior node into this portion of the hardware description, e.g., ties the data output from the prior node into the input of dependent sub-modules as well as control path logic to maintain the semantics of the original graphical program.

Figure 8:
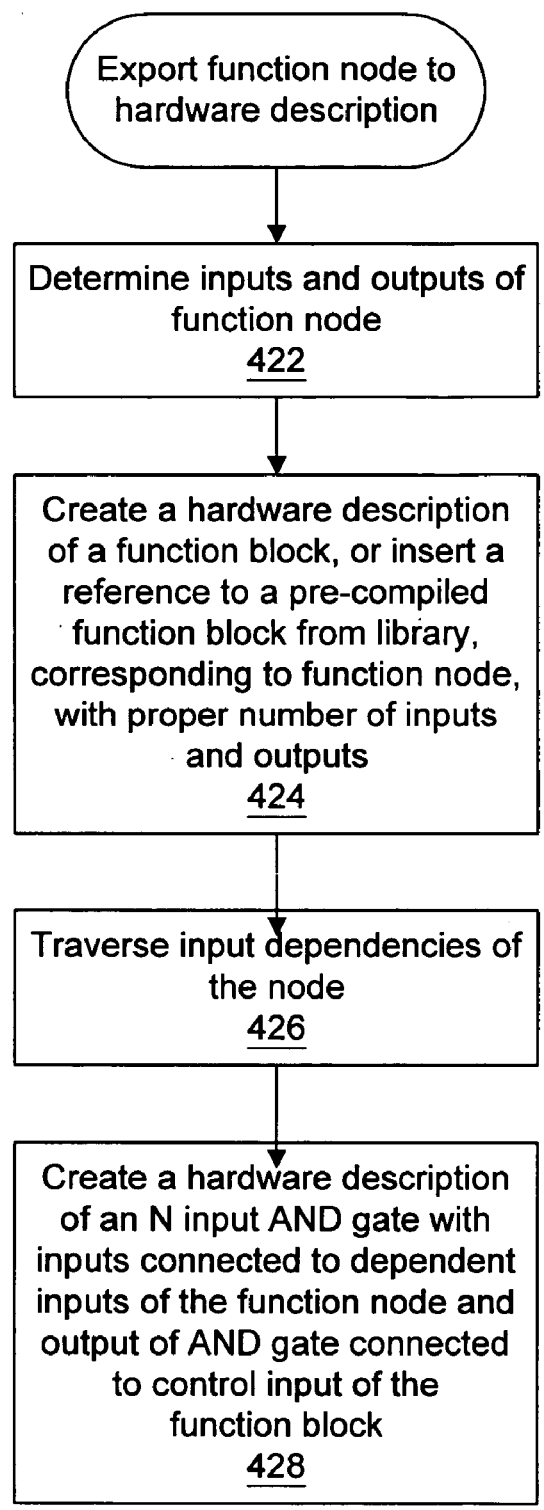
FIG. 8 is a flowchart diagram illustrating operation where the method exports a function node into a hardware description.

FIG. 8—Exporting a Function Node into a Hardware Description

FIG. 8 is a flowchart diagram illustrating operation where the method exports a function node into the hardware description format. In the preferred embodiment, the term "function node" refers to any various types of icons or items which represent a function being performed. Thus, a function node icon represents a function being performed in the graphical program. Examples of function nodes include arithmetic function nodes, e.g., add, subtract, multiply, and divide nodes, trigonometric and logarithmic function nodes, comparison function nodes, conversion function nodes, string function nodes, array and cluster function nodes, file I/O function nodes, etc.

As shown in FIG. 8, in step 422 the method determines the inputs and outputs of the function node. In step 424 the method creates a hardware description of the function block corresponding to the function node with the proper number of inputs and outputs as determined in step 422. Alternatively, in step 424 the method includes a reference in the hardware description to a pre-compiled function block from the library 308. In this case, the method also includes the determined number of inputs and outputs of the function node.

In step 426 the method traverses the input dependencies of the node to determine which other nodes provide outputs that are provided as inputs to the function node being converted. In step 428 the method creates a hardware description of an N input AND gate, wherein N is the number of inputs to the node, with each of the N inputs connected to control outputs of nodes which provide inputs to the function node. The output of the AND gate is connected to a control input of the function block corresponding to the function node.

In the data flow diagramming model of the preferred embodiment, a function node can only execute when all of its inputs have been received. The AND gate created in step 428 emulates this function by receiving all control outputs of nodes which provide inputs to the function node. Thus the AND gate operates to effectively receive all of the dependent inputs that are connected to the function node and AND them together to provide an output control signal which is determinative of whether the function node has received all of its inputs. The output of the AND gate is connected to the control input of the function block and operates to control execution of the function block. Thus, the function block does not execute until the AND gate output provided to the control input of the function block provides a logic signal indicating that all dependent inputs which are input to the function node have been received.

Figure 9:
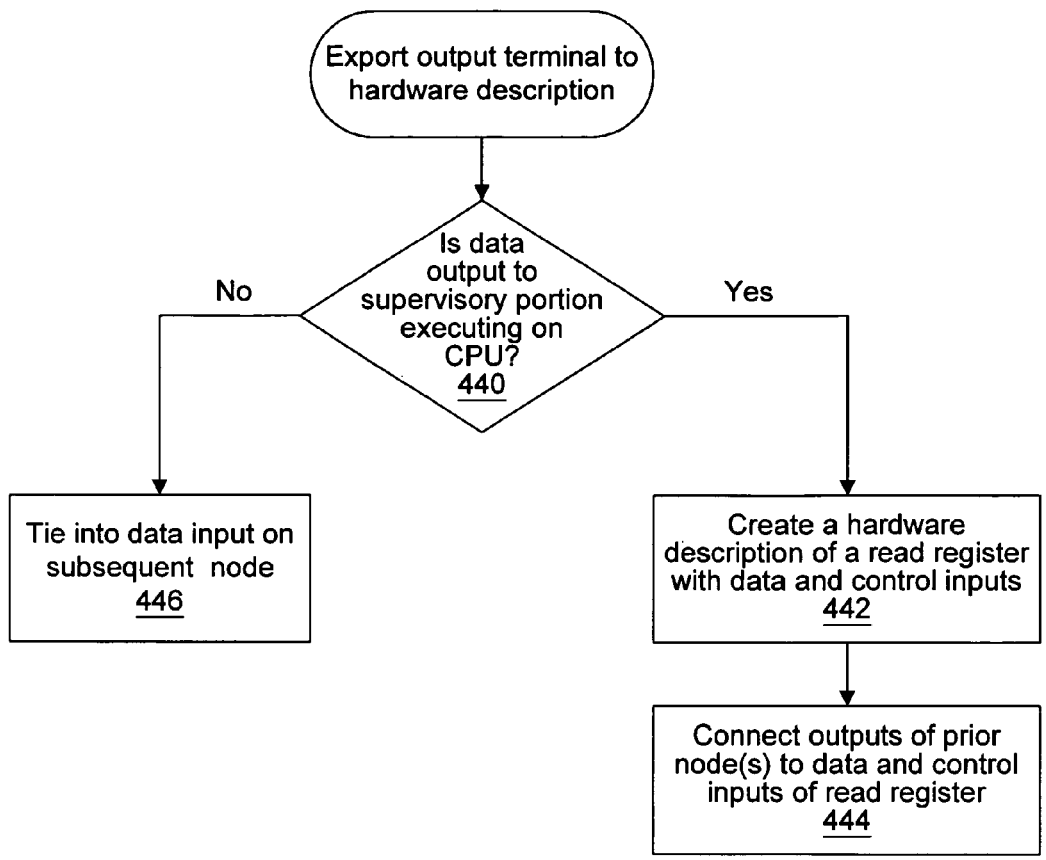
FIG. 9 is a flowchart diagram illustrating operation where the method exports an output terminal into a hardware description.

FIG. 9—Exporting an Output Terminal into a Hardware Description

FIG. 9 is a flowchart diagram illustrating operation where the method exports an output terminal into the hardware description. As shown, in step 440 the method determines if the data provided from the output terminal is output to a portion of the graphical program which will be executing on the CPU, i.e., the portion of the graphical program which is to be compiled into machine language for execution on the CPU, or whether the data is output to another portion of the graphical program that is also being transformed into a hardware implementation.

As shown, if the data output from the output terminal is determined in step 440 to be output to a portion of the graphical program being compiled for execution on the CPU, then in step 442 the method creates a hardware description of a read register with a data input and data and control outputs. The read register is operable to receive data generated by logic representing a prior node in the graphical program.

In step 444 the method connects the data output of a prior node to the data input of the read register. In step 444 the control input of the read register is also connected to control sequencing of execution, i.e., to guarantee that the read register receives data at the proper time. This enables the hardware description to have the same or similar execution order as the graphical program.

If the data is determined to not be output to a portion being compiled for execution on the CPU step in 440, i.e., the data is to another node in the portion being converted into a hardware implementation, then in step 446 the method ties the data output from the output terminal into a subsequent node in this portion of the hardware description, e.g., ties the data output from the output terminal into the input of subsequent sub-modules as well as control path logic to maintain the semantics of the original graphical program.

Figure 10:
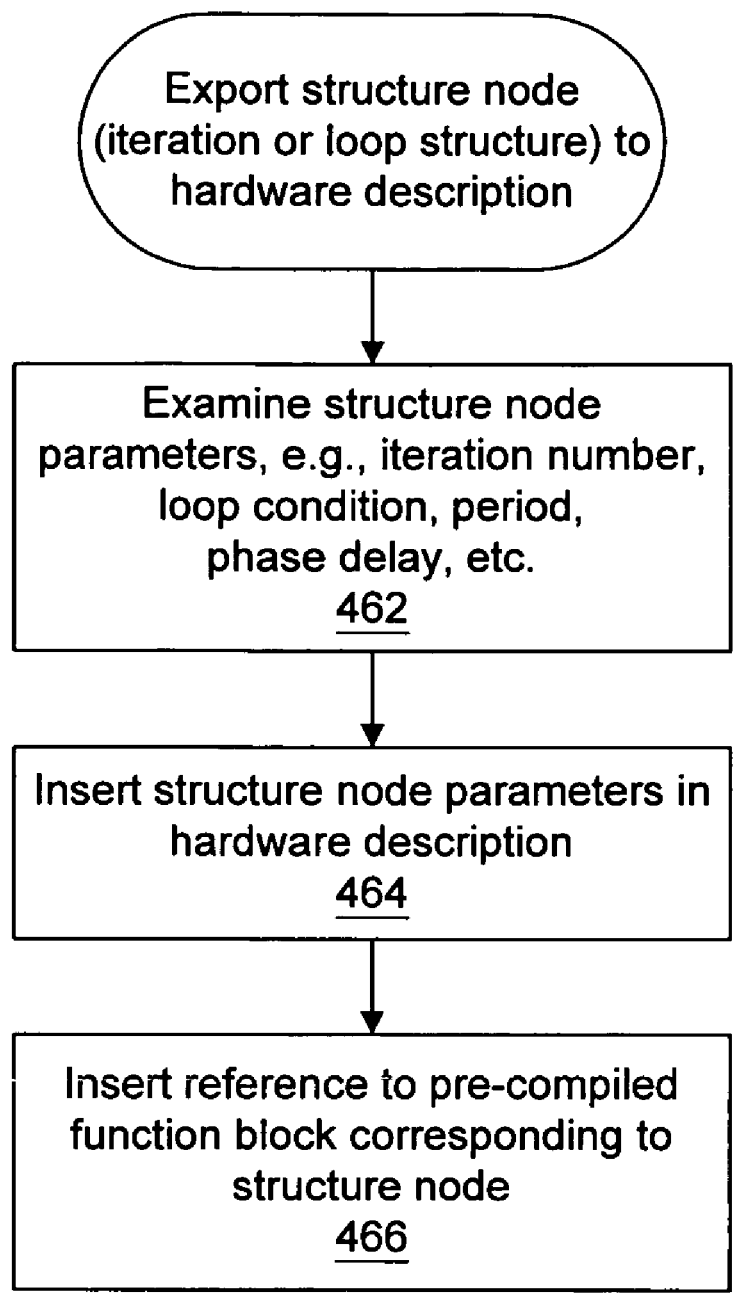
FIG. 10 is a flowchart diagram illustrating operation where the method exports a structure node into a hardware description.

FIG. 10—Exporting a Structure Node into a Hardware Description

FIG. 10 is a flowchart diagram illustrating operation where the method exports a structure node into the hardware description. In the preferred embodiment, the term "structure node" refers to a node which represents control flow of data, including iteration, looping, sequencing, and conditional branching. Examples of structure nodes include For/Next loops, While/Do loops, Case or Conditional structures, and Sequence structures. For more information on structure nodes, please see the above LabVIEW patents referenced above.

The flowchart of FIG. 10 illustrates exporting a loop structure node into a hardware description. As shown, in step 462 the method examines the structure node parameters, e.g., the iteration number, loop condition, period, phase delay, etc. As discussed above, the graphical programming system preferably allows the user to insert certain parameters into a structure node to facilitate exporting the structure node into a hardware description. Iteration and looping structure nodes have previously included an iteration number and loop condition, respectively. According to the preferred embodiment of the invention, these structure nodes further include period and phase delay parameters, which are inserted into or assigned to the structure node. These provide information on the period of execution and the phase delay of the structure node. As discussed below, the period and phase delay parameters, as well as the iteration number or loop condition, are used to facilitate exporting the structure node into a hardware description.

In step 464, the method inserts the structure node parameters into the hardware description. In step 466 the method inserts a reference to a pre-compiled function block corresponding to the type of structure node. In the case of a looping structure node, the method inserts a reference to a pre-compiled function block which implements the looping function indicated by the structure node. The method also connects controls to the diagram enclosed by the structure node.

Figure 11:
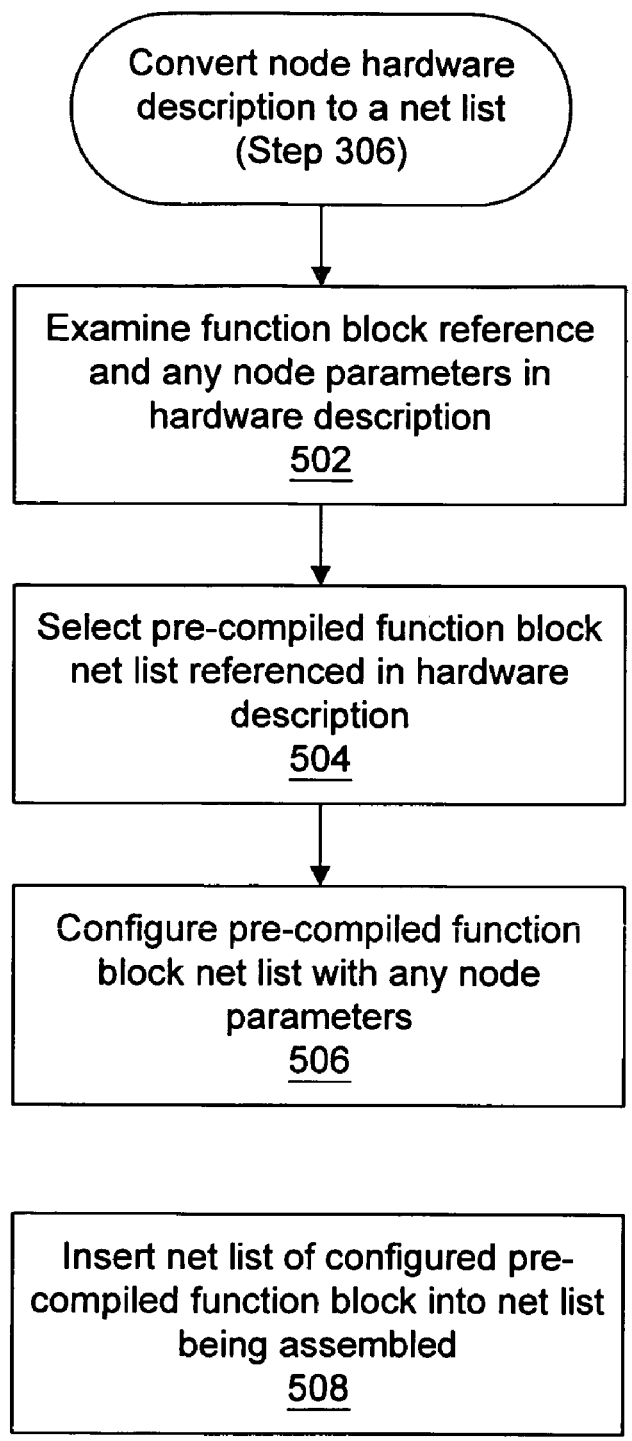
FIG. 11 illustrates converting a node hardware description to a net list.

FIG. 11—Converting a Node into a Hardware Description

FIG. 11 is a flowchart diagram of a portion of step 306 of FIGS. 4 and 4A, illustrating operation where the method converts the hardware description for a node into a net list. FIG. 11 illustrates operation of converting a hardware description of a node, wherein the hardware description comprises a reference to a function block and may include node parameters. It is noted that where the hardware description of a node comprises a description of the actual registers, gates, etc. which perform the operation of the node, then conversion of this hardware description to a net list is readily performed using any of various types of synthesis tools.

As shown, in step 502 the method examines the function block reference and any node parameters present in the hardware description. In step 504, the method selects the referenced pre-compiled function block from the library 308, which essentially comprises a net list describing the function block. In step 506 the method then configures the pre-compiled function block net list with any parameters determined in step 502. In step 508 the method then inserts the configured pre-compiled function block into the net list which is being assembled.

Figure 12:
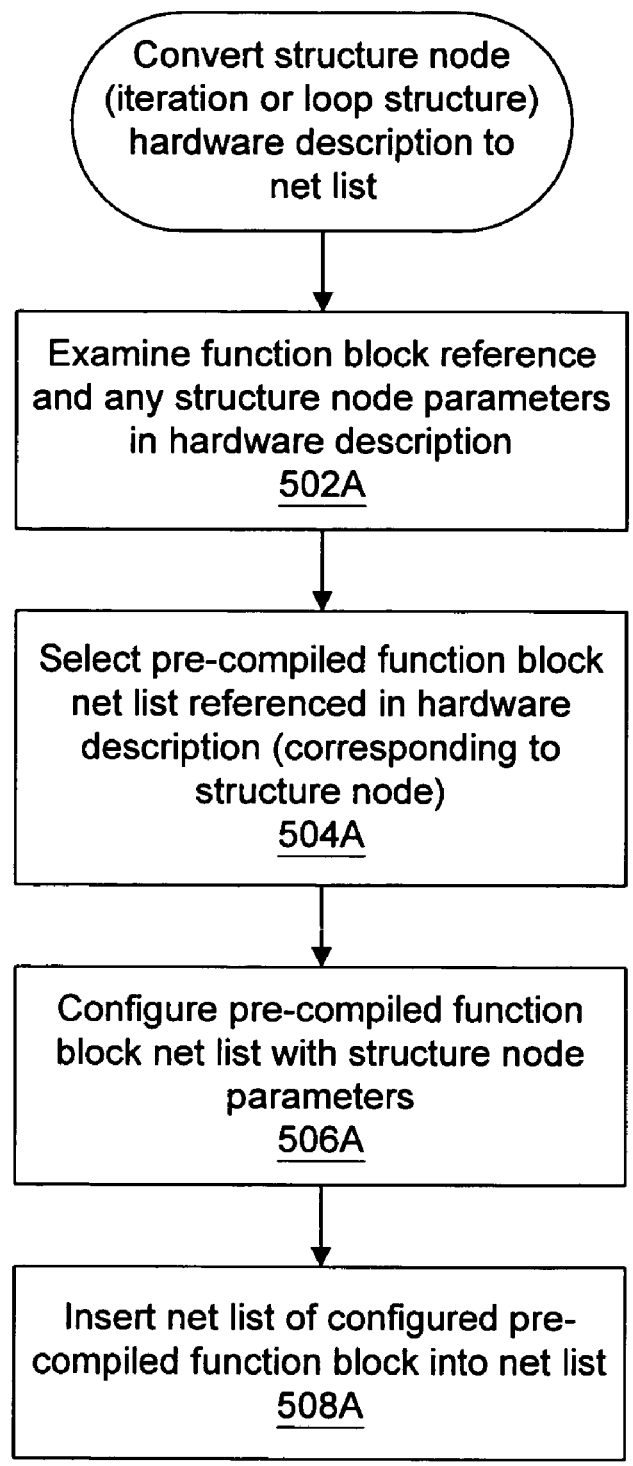
FIG. 12 illustrates converting a structure node hardware description to a net list.

FIG. 12—Converting a Structure Node into a Hardware Description

FIG. 12 is a flowchart diagram illustrating operation of the flowchart of FIG. 11, where the method converts the hardware description for a structure node into a net list. FIG. 12 illustrates operation of converting a hardware description of a structure node, wherein the hardware description comprises a reference to a structure node function block and includes structure node parameters.

As shown, in step 502A the method examines the function block reference and the structure node parameters present in the hardware description. The structure node parameters may include parameters such as the iteration number, loop condition, period, phase delay, etc. In step 504A the method selects the referenced pre-compiled function block from the library 308, which essentially is a net list describing the structure node function block. In step 506A the method then configures the pre-compiled function block net list with the structure node parameters determined in step 502A. This involves setting the period and phase delay of execution of the structure node as well as any other parameters such as iteration number, loop condition, etc. In step 508A the method then inserts the configured pre-compiled function block into the net list which is being assembled.

Figure 13:
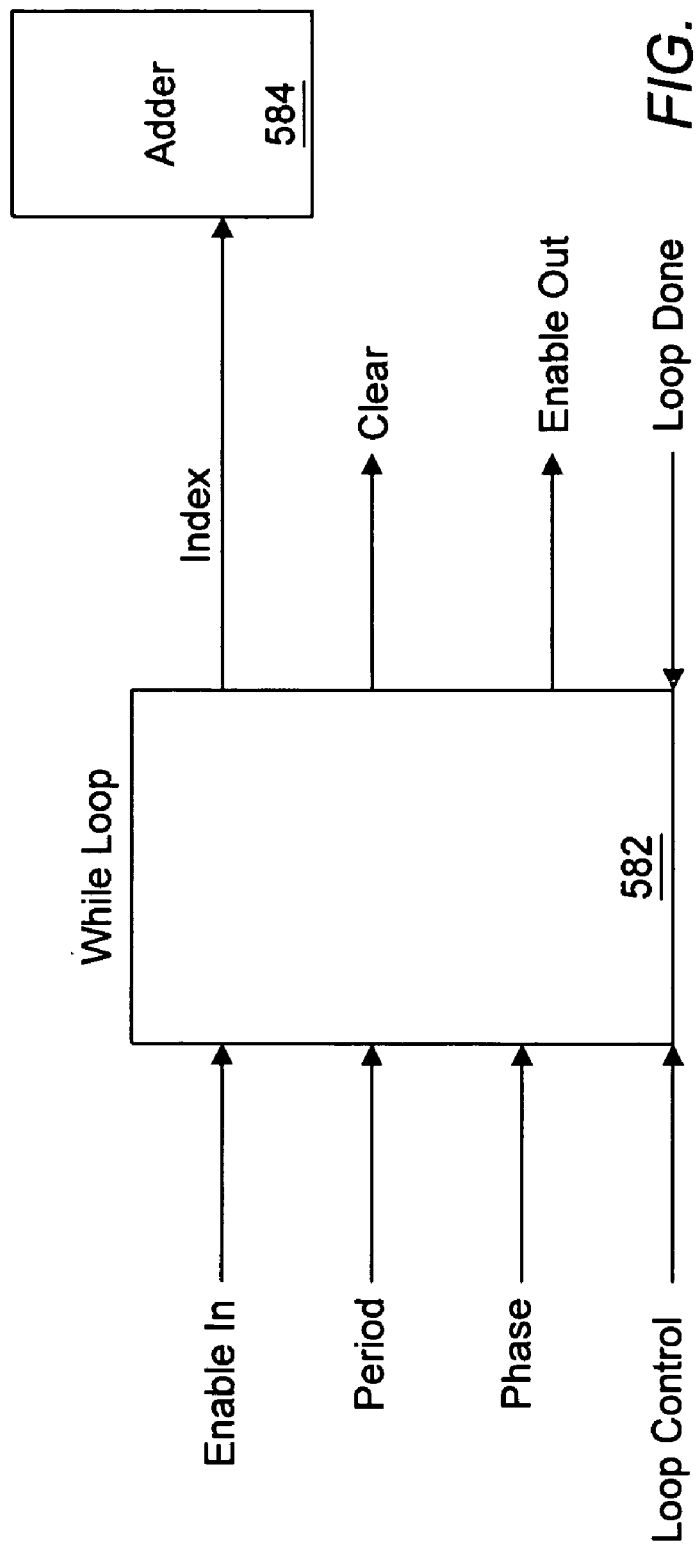
FIG. 13 illustrates the function block for a structure node.

FIG. 13—Function Block for a Structure Node

FIG. 13 is a block diagram illustrating a While loop function block. As shown, the While loop function block includes enabling period and phase inputs as well as a loop control input. The While loop function block provides an index output which is provided to and adder. The adder operates to increment each time the index signals provided to monitor the number of times the While loop is executed. The While loop further outputs Clear and Enable Out signals to control the program within the While loop and further receives a Loop Done signal input which is used to indicate whether the loop has completed.

Figure 14:
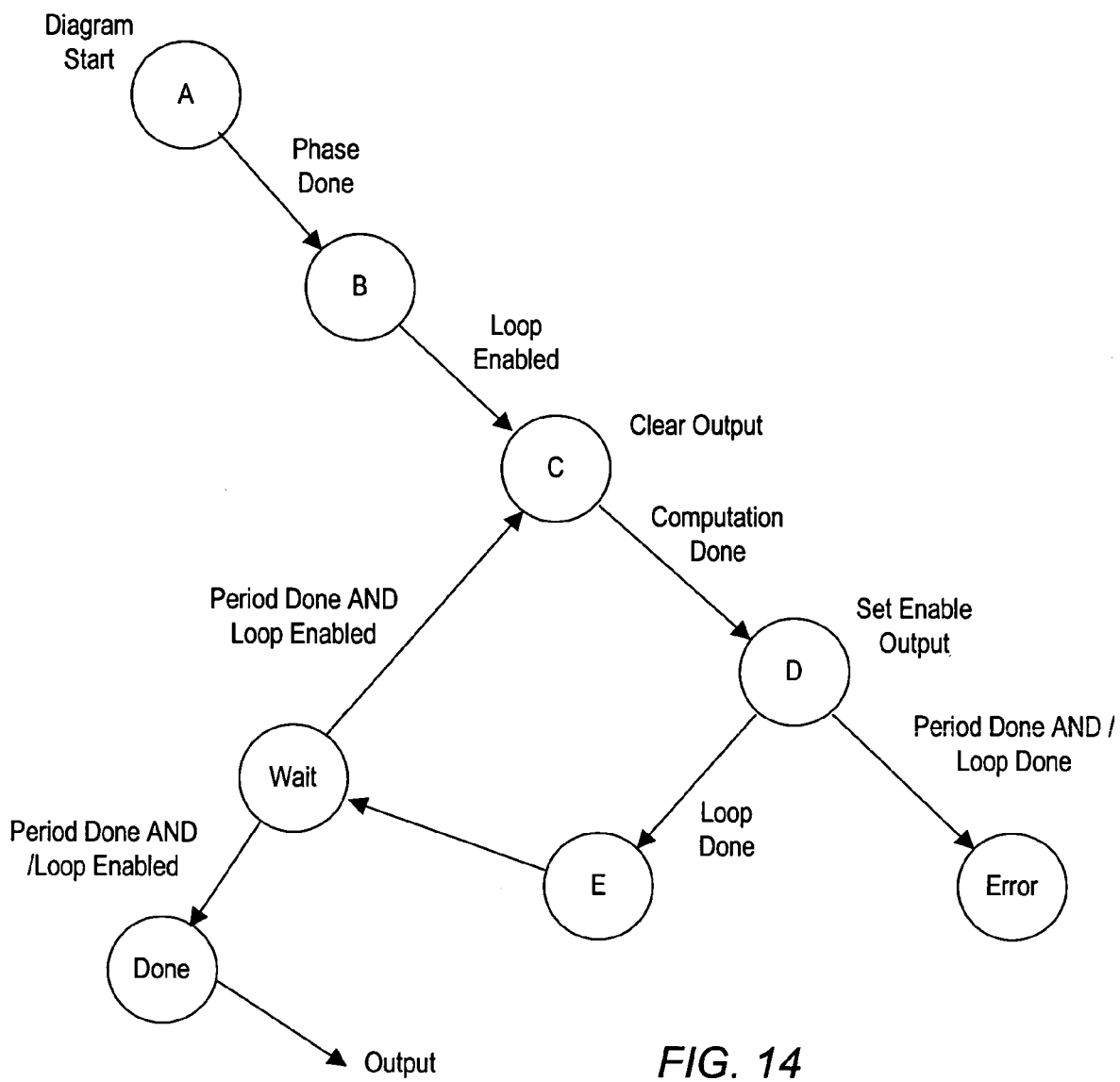
FIG. 14 is a state diagram illustrating operation of the structure node function block of FIG. 13.

FIG. 14—Operation of Structure Node Function Block

FIG. 14 is a state diagram illustrating operation of the while loop function block shown in FIG. 13. As shown, a diagram start operation precedes to state A. When Phase Done is true indicating that the phase has completed, then the state machine advances to state B. The state machine remains in state B until the Loop Enable signal is true, indicating that the loop has been enabled to begin execution. When the Loop Enable signal is asserted, the state machine advances from state B to state C. In state C the Clear Output signal is asserted, clearing the loop output prior to execution of the loop.

The state machine then advances from state C to state D. In state D the computation is performed, and the Set Enable out signal is asserted. If the period is done and the loop is not yet completed, signified by the equation:

Period Done and /Loop Done then the state machine proceeds to an error state and operation completes. Thus, the period set for execution for the loop was not sufficiently long to allow the loop to complete. In other words, the loop took more time to complete than the period set for execution of the loop.

The state machine advances from state D to state E when the Loop Done signal is asserted prior to the Period Done signal being asserted, indicating that the loop has completed prior to the period allotted for the loop execution being over.

The state machine then advances from state E to a wait state, as shown. If the period is done and the loop is not re-enabled, signified by the condition:

Period Done & /Loop Enabled then the state machine advances from the Wait to the Done state. If the period has completed and the loop is still enabled, indicating that another execution of the loop is necessary, then the state machine advances from the Wait state back to the C state. Thus, the state machine advances through state C, D, E, and Wait to perform looping operations.

Figure 15:
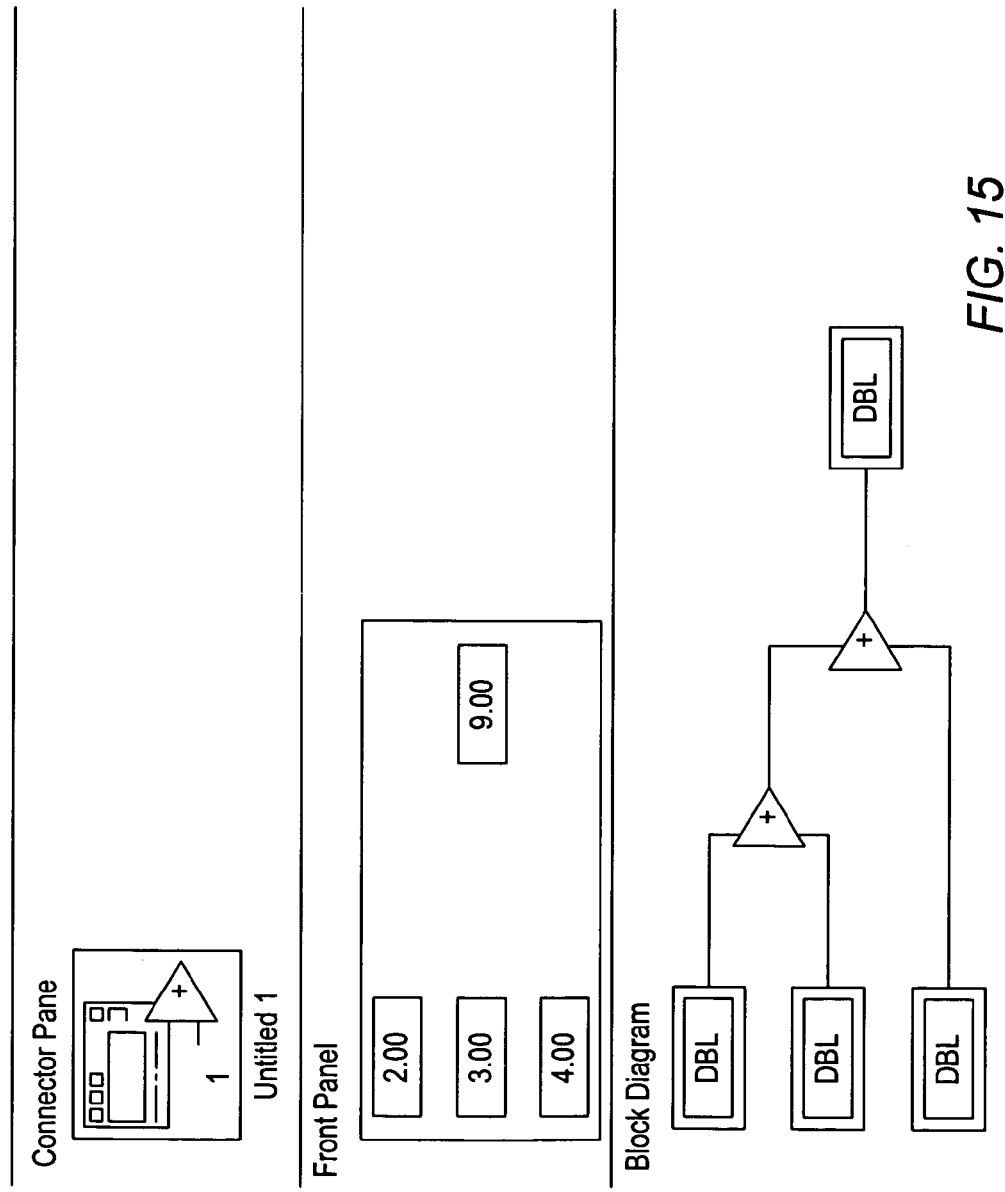

FIG. 15—Simple Graphical Program Example

FIG. 15 illustrates a simple example of a graphical program. In FIG. 15 the graphical program includes three input terminals and one output terminal. The graphical program simply comprises a first 2-input Add function node which receives input from two inputs terminals, and a second 2-input Add function node which receives the output from the first Add function node and receives an output from the third input terminal. The second 2-input Add function node provides an output to output terminal as shown.

Figure 16:
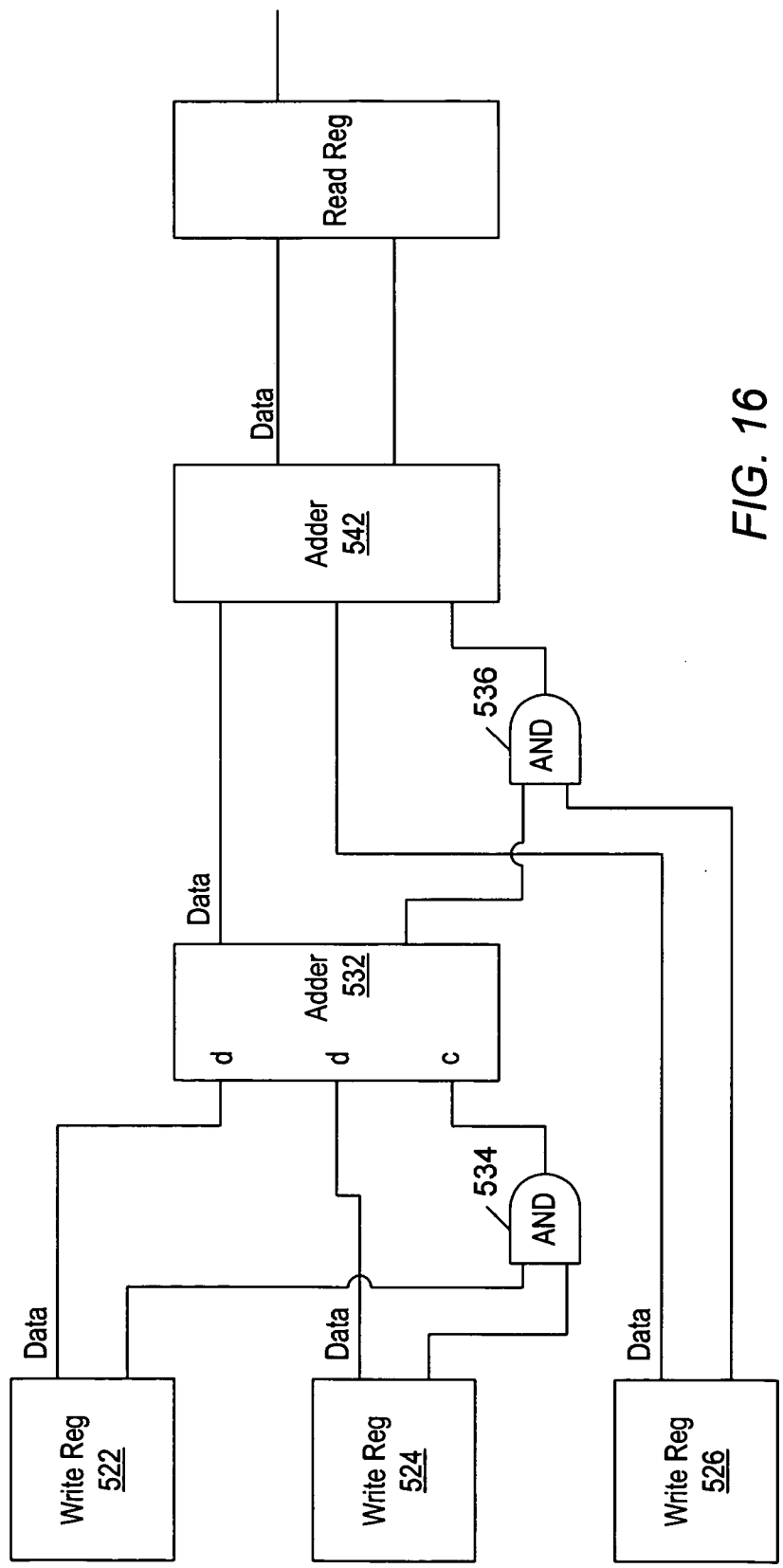

FIG. 16—Hardware Result

FIG. 16 is a conceptual diagram of the resulting hardware after the graphical program example of FIG. 15 is converted into a hardware description. As shown, the hardware diagram includes three write registers 522–526 corresponding to each of the three input terminals. The data outputs of the first two write registers 522 and 524 are provided as inputs to a first two-input adder 532, which corresponds to the first adder in the block diagram of FIG. 15. The hardware description also involves creating an AND gate 534 which receives control outputs from each of the first two write registers 522 and 524 and provides a single output to the control input of the adder 532. The purpose of the AND gate 534 is to prevent the adder 532 from executing until both inputs have been received.

The Adder 532 provides a data output to a second two-input Adder 542, which corresponds to the second adder in the block diagram of FIG. 15. The first Adder 532 also generates an enable out signal which is provided to an input of a second AND gate 536. The other input of the AND gate 536 receives an output from the third write register 526, corresponding to the third input terminal. The AND gate 536 provides an output to a control input of the second adder 542. Thus, the AND gate 536 operates to ensure that the second adder 542 does not execute until all inputs have been received by the adder 542. The second adder 542 provides a data output to a read register 546 associated with the output terminal. The second adder 542 also provides an enable out signal to the read register 546, which notifies the read register 546 when valid data has been provided.

Thus, as shown, to create a hardware description for each of the input terminals, the flowchart diagram of FIG. 6 is executed, which operates to create a hardware description of a write register 522, 524, and 526, each with data and control outputs. For each adder function node, the flowchart diagram of FIG. 7 is executed, which operates to create a hardware description of an adder 532 or 542, and further creates an associated N input AND gate 534 or 536, with inputs connected to the dependent inputs of the adder function node to ensure execution at the proper time. Finally, the flowchart diagram of FIG. 8 is executed for the output terminal of the graphical program, which operates to generate a hardware description of a read register with data and control inputs.

Figure 17:
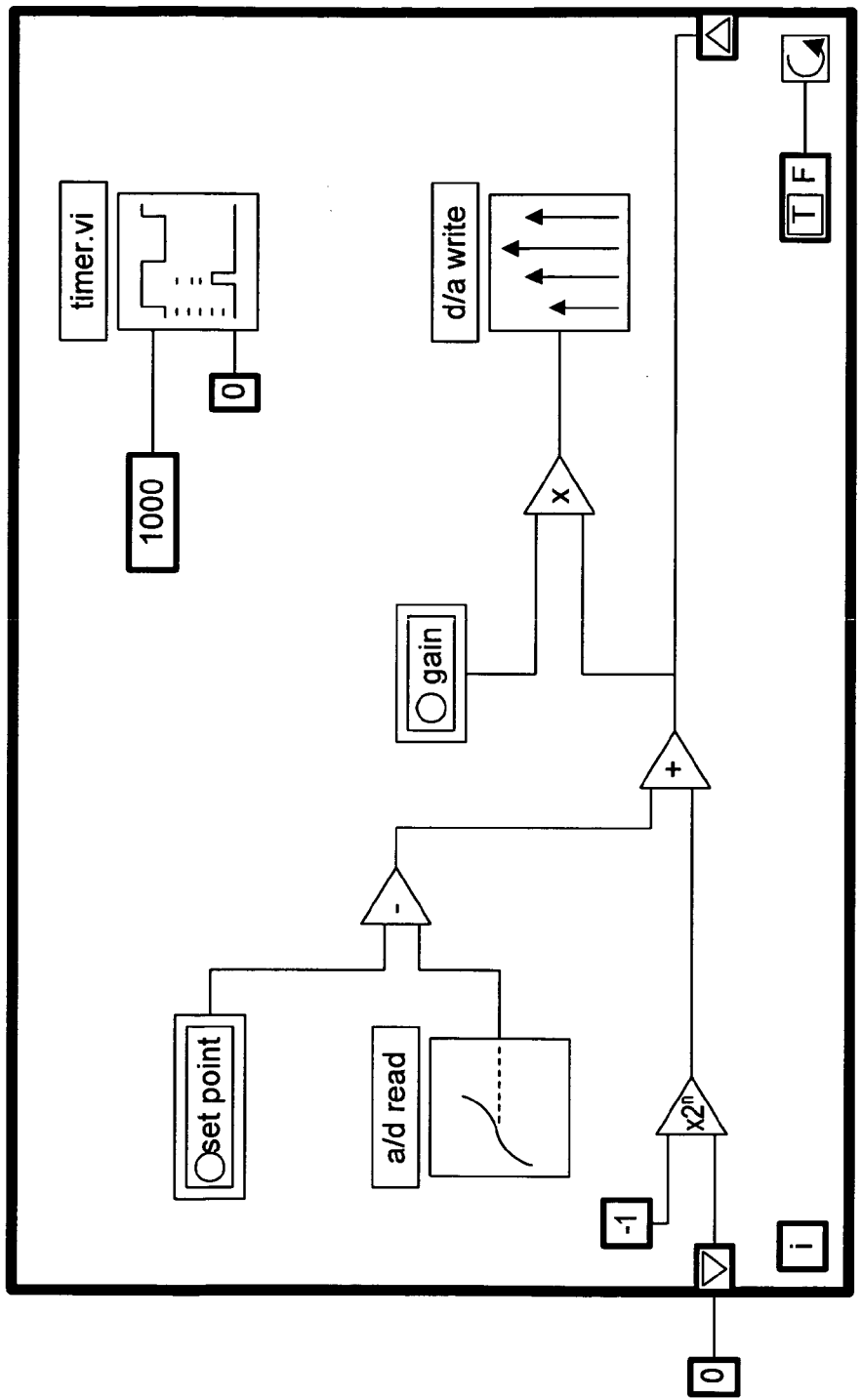
Figure 18:
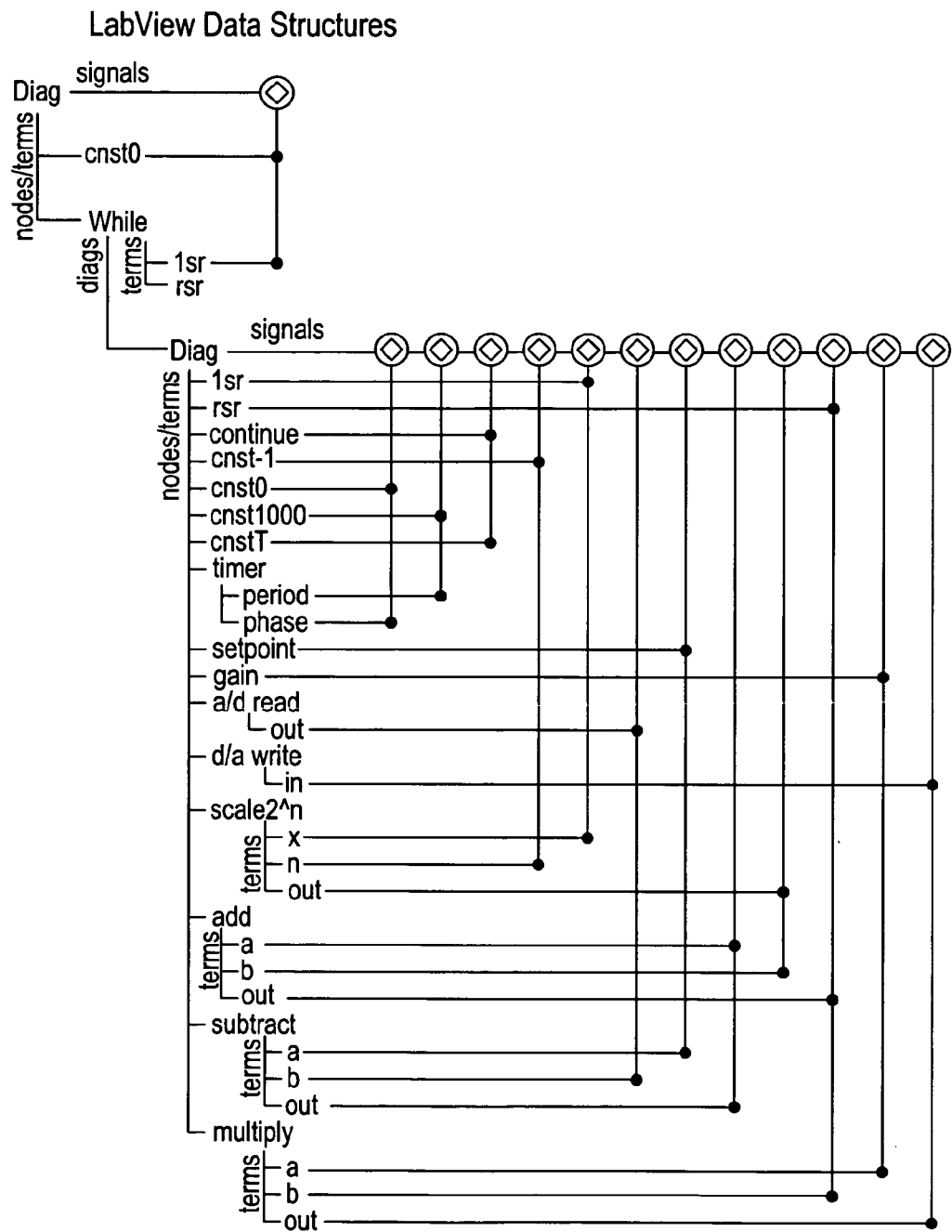
Figure 19:
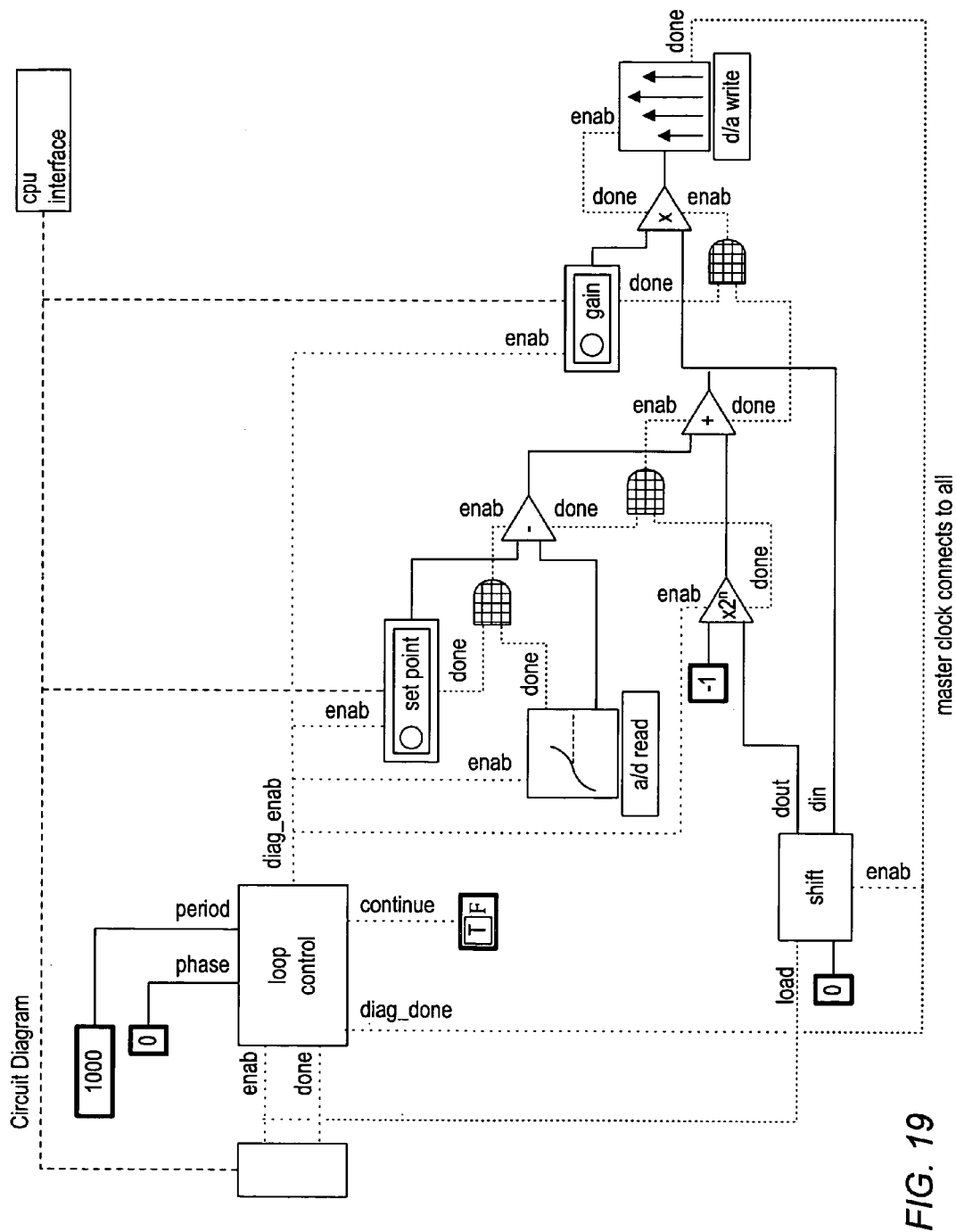

FIGS. 17–19: Example of Converting a Graphical Program into a Hardware Implementation FIGS. 17–19 comprise a more detailed example illustrating operation of the present invention.

FIG. 17 illustrates an example graphical program (a LabVIEW diagram) which is converted into an FPGA implementation using the present invention. As shown, the graphical program comprises a plurality of interconnected nodes comprised in a While loop. As shown, the While loop includes shift register icons, represented by the down and up arrows at the left and right edges, respectively, of the While loop. A 0 constant positioned outside of the While loop is connected to the down arrow of the shift register at the left edge of the While loop.

The While loop includes a timer icon representing or signifying timing for the While loop. The timer icon includes inputs for period and phase. As shown, the timer icon receives a constant of 1000 for the period and receives a constant of 0 for the phase. In an alternate embodiment, the While loop includes input terminals which are configured to receive timing information, such as period and phase.

FIG. 18 illustrates the LabVIEW data structures created in response to or representing the diagram or graphical program of FIG. 17. The data structure diagram of FIG. 17 comprises a hierarchy of data structures corresponding to the diagram of FIG. 17. As shown, the LabVIEW data structure representation includes a top level diagram which includes a single signal connecting the 0 constant to the left hand shift register of the While loop. Thus the top level diagram includes only the constant (0) and the While loop.

The While loop includes a sub-diagram which further includes left and right shift register terms, the continue flag of the While loop, a plurality of constants, a timer including period and phase inputs, global variables setpoint and gain, sub-VIs a/d read and d/a write, and various function icons, e.g., scale, add, subtract, and multiply. Further, each of the objects in the diagram have terminals, and signals connect between these terminals.

FIG. 19 illustrates a circuit diagram representing the hardware description which is created in response to the data structures of FIG. 18. The circuit diagram of FIG. 19 implements the graphical program of FIG. 17. As shown, the CPU interface signals are bussed to the global variables. Although not shown in FIG. 19, the CPU interface signals are also provided to the sub-VIs a/d read and d/a write.

The While loop is essentially abstracted to a control circuit which receives the period and phase, and includes an external enable directing the top level diagram to execute, which starts the loop. The loop then provides a diagram enable(diag_enab) signal to start the loop and waits for a diagram done (diag_done) signal to signify completion of the loop, or the period to expire. Based on the value of the Continue flag, the loop provides a subsequent diag_enab signal or determines that the loop has finished and provides a Done signal to the top level diagram. Although not shown in FIG. 19, the loop control block also provides a diagram clear enable out (diag_clear_enab_out) signal to every node in the sub-diagram of the While loop. Thus the loop control block outputs a diagram enable (diag_enab) signal that is fed to all of the starting nodes in the diagram within the While loop. The Done signals from these items are fed into an AND gate, whose output is provided to enable subsequent nodes.

The shift register includes a data in, a data out and an enable input which clocks the data in (din) to the data out (dout), and a load which clocks the initial value into the shift register.

The following is the VHDL description corresponding to the example of FIGS. 17–19, wherein the VHDL description was created using the present invention:

```
library ieee;
use ieee.std_logic_1164.all;
entity example0 is
    port (
    clk : in std_logic;
    enable_in : in std_logic;
    clr_enable_out : in std_logic;
    da_clk : in std_logic;
    cpu_clk : in std_logic;
    cpu_reset : in std_logic;
    cpu_iord : in std_logic;
    cpu_iowt : in std_logic;
    cpu_devsel : in std_logic;
    cpu_ioaddr : in std_logic_vector(31 downto 0);
    cpu_iodata : in std_logic_vector(31 downto 0);
    ad_clk : in std_logic;
    enable_out : out std_logic
    );
end example0;
architecture Structural of example0 is
    signal sCLK : std_logic;
    signal sda_clk : std_logic;
    signal scpu_clk : std_logic;
    signal scpu_reset : std_logic;
    signal scpu_iord : std_logic;
    signal scpu_iowt : std_logic;
    signal scpu_devsel : std_logic;
    signal scpu_ioaddr : std_logic_vector(31 downto 0);
    signal scpu_iodata : std_logic_vector(31 downto 0);
    signal sad_clk : std_logic;
    signal s1AC : std_logic_vector(15 downto 0);
    signal s115 : std_logic; -- node 114 enable_out
    constant cE8C : std_logic_vector(15 downto 0) :=
"0000000000000000";-
    signal s114 : std_logic; -- diagram done
    signal s116 : std_logic; -- diagram clr_enable_out
    signal s278D : std_logic; -- node 278C enable_out
    signal s145 : std_logic; -- node 144 enable_out
    component shift16
        port (
            clk : in std_logic;
            enable_in, load : in std_logic;
            initval : in std_logic_vector(15 downto 0);
            din : in std_logic_vector(15 downto 0);
```

```vhdl
        dout : out std_logic_vector(15 downto 0)
    );
end component;
signal s1310 : std_logic_vector(15 downto 0);
signal s209C : std_logic_vector(15 downto 0);
signal s1344 : std_logic_vector(15 downto 0);
signal s1628 : std_logic_vector(15 downto 0);
signal s1270 : std_logic_vector(15 downto 0);
signal s1684 : std_logic_vector(15 downto 0);
signal s19CC : std_logic_vector(15 downto 0);
signal s1504 : std_logic_vector(15 downto 0);
signal s149C : std_logic_vector(15 downto 0);
signal sC44 : std_logic_vector(31 downto 0);
signal s974 : std_logic_vector(31 downto 0);
signal s4D8 : std_logic;
signal s2A1 : std_logic; -- node 2A0 enable_out
constant c470 : std_logic := '1';
constant c948 : std_logic_vector(31 downto 0) :=
"00000000000000000000001111101000"; -- 1000
constant cC04 : std_logic_vector(31 downto 0) :=
"00000000000000000000000000000000"; -- 0
constant c1960 : std_logic_vector(15 downto 0) :=
"1111111111111111"; -- −1
signal s2A0 : std_logic; -- diagram done
signal s2A2 : std_logic; -- diagram clr_enable_out
component write_reg
    port (
        clk: in std_logic;
        enable_in : in std_logic;
        clr_enable_out : in std_logic;
        cpu_clk : in std_logic;
        cpu_reset : in std_logic;
        cpu_iord : in std_logic;
        cpu_iowt : in std_logic;
        cpu_devsel : in std_logic;
        cpu_ioaddr : in std_logic_vector(31 downto 0);
        cpu_iodata : in std_logic_vector(31 downto 0);
        decodeaddr : in std_logic_vector(3 downto 0);
        data : out std_logic_vector(15 downto 0);
        enable_out : out std_logic
    );
end component;
signal s5BA : std_logic_vector(3 downto 0);
constant c5B8 : std_logic_vector(3 downto 0) := "00";
signal s1A7E : std_logic_vector(3 downto 0);
constant c1A7C : std_logic_vector(3 downto 0) := "10";
signal s641 : std_logic; -- node 640 enable_out
signal s39D : std_logic; -- node 39C enable_out
component a_d_read
    port (
        clk : in std_logic;
        enable_in, clr_enable_out : in std_logic;
        ai_read_val : out std_logic_vector(15 downto 0);
        ad_clk : in std_logic;
        enable_out : out std_logic
    );
end component;
signal s13A1 : std_logic; -- node 13A0 enable_out
component prim_Scale_By_Power_Of_2_16
    port (
        clk : in std_logic;
        enable_in, clr_enable_out : in std_logic;
        x_2_n : out std_logic_vector(15 downto 0);
        x : in std_logic_vector(15 downto 0);
        n : in std_logic_vector(15 downto 0);
        enable_out : out std_logic
    );
end component;
signal s10E9 : std_logic; -- node 10E8 enable_out
component prim_Subtract_16
    port (
        clk : in std_logic;
        enable_in, clr_enable_out : in std_logic;
        x_y : out std_logic_vector(15 downto 0);
        y : in std_logic_vector(15 downto 0);
        x : in std_logic_vector(15 downto 0);
        enable_out : out std_logic
    );
end component;
signal s14D1 : std_logic; -- node 14D0 enable_out
component prim_Add_16
    port (
        clk : in std_logic;
        enable_in, clr_enable_out : in std_logic;
        x_y : out std_logic_vector(15 downto 0);
        y : in std_logic_vector(15 downto 0);
        x : in std_logic_vector(15 downto 0);
        enable_out : out std_logic
    );
end component;
signal s1A01 : std_logic; -- node 1A00 enable_out
component prim_Multiply_16
    port (
        clk : in std_logic;
        enable_in, clr_enable_out : in std_logic;
        x_y : out std_logic_vector(15 downto 0);
        y : in std_logic_vector(15 downto 0);
        x : in std_logic_vector(15 downto 0);
        enable_out : out std_logic
    );
end component;
signal s1725 : std_logic; -- node 1724 enable_out
component d_a_write
    port (
        clk : in std_logic;
        enable_in, clr_enable_out : in std_logic;
        a0_write_val : in std_logic_vector(15 downto 0);
        da_clk : in std_logic;
        enable_out : out std_logic
    );
end component;
component whileloop_timed
    port (
        clk : in std_logic;
        enable_in, clr_enable_out : in std_logic;
        diag_enable, diag_clr_enable_out : out std_logic;
        diag_done : in std_logic;
        period : in std_logic_vector(15 downto 0);
        phase : in std_logic_vector(15 downto 0);
        continue : in std_logic;
        enable_out : out std_logic
    );
end component;
begin
s114 <= s278D AND s145;
s1AC <= cE8C;
nDF8: shift16
    port map(
        clk => sCLK,
        load => s115,
        enable_in => s2A0,
        initval => s1AC,
        din => s1344,
        dout => s19CC
    );
s2A0 <= s1725;
s4D8 <= c470;
s974 <= c948;
sC44 <= cC04;
s1684 <= c1960;
-- setpoint
n5B8: write_reg
    port map(
        clk => sCLK,
        enable_in => s2A1,
        clr_enable_out => s2A2,
        enable_out => s5B9,
        cpu_clk => scpu_clk,
        cpu_reset => scpu_reset,
        cpu_iord => scpu_iord,
        cpu_iowt => scpu_iowt,
        cpu_devsel => scpu_devsel,
        cpu_ioaddr => scpu_ioaddr,
        cpu_iodata => scpu_iodata,
        decodeaddr => s5BA,
        data => s149C
    );
s5BA <= c5B8;
```

```
-- gain
n1A7C: write_reg
    port map(
        clk => sCLK,
        enable_in => s2A1,
        clr_enable_out => s2A2,
        enable_out => s1A7D,
        cpu_clk => scpu_clk,
        cpu_reset => scpu_reset,
        cpu_iord => scpu_iord,
        cpu_iowt => scpu_iowt,
        cpu_devsel => scpu_devsel,
        cpu_ioaddr => scpu_ioaddr,
        cpu_iodata => scpu_iodata,
        decodeaddr => s1A7E,
        data => s1628
    );
s1A7E <= c1A7C;
n39C: a_d_read
    port map(
        clk => sCLK,
        enable_in => s2A1,
        clr_enable_out => s2A2,
        ai_read_val => s1504,
        ad_clk => sad_clk,
        enable_out => s39D
    );
n13A0: prim_Scale_By_Power_Of_2_16
    port map(
        clk => sCLK,
        enable_in => s2A1,
        clr_enable_out => s2A2,
        x_2_n => s1270,
        x => s19CC,
        n => s1684,
        enable_out => s13A1
    );
s10E8 <= s39D AND s5B9;
n10E8: prim_Subtract_16
    port map(
        clk => sCLK,
        enable_in => s10E8,
        clr_enable_out => s2A2,
        x_y => s1310,
        y => s1504,
        x => s149C,
        enable_out => s10E9
    );
s14D0 <= s13A1 AND s10E9;
n14D0: prim_Add_16
    port map(
        clk => sCLK,
        enable_in => s14D0,
        clr_enable_out => s2A2,
        x_y => s1344,
        y => s1270,
        x => s1310,
        enable_out => s14D1
    );
s1A00 <= s14D1 AND s1A7D;
n1A00: prim_Multiply_16
    port map(
        clk => sCLK,
        enable_in => s1A00,
        clr_enable_out => s2A2,
        x_y => s209C,
        y => s1344,
        x => s1628,
        enable_out => s1A01
    );
n1724: d_a_write
    port map(
        clk => sCLK,
        enable_in => s1A01,
        clr_enable_out => s2A2,
        a0_write_val => s209C,
        da_clk => sda_clk,
        enable_out => s1725
    );
n144: whileloop_timed
    port map(
        clk => sCLK,
        enable_in => s115,
        clr_enable_out => s116,
        period => sC44,
        phase => s974,
        diag_enable => s2A1,
        diag_clr_enable_out => s2A2,
        diag_done => s2A0,
        continue => s4D8,
        enable_out => s145
    );
sCLK <= clk;
s115 <= enable_in;
s116 <= clr_enable_out;
s114 <= enable_out;
sda_clk <= da_clk;
scpu_clk <= cpu_clk;
scpu_reset <= cpu_reset;
scpu_iord <= cpu_iord;
scpu_iowt <= cpu_iowt;
scpu_devsel <= cpu_devsel;
scpu_ioaddr <= cpu_ioaddr;
scpu_iodata <= cpu_iodata;
sad_clk <= ad_clk;
end Structural;
```

Component Library

The preferred embodiment of the present invention includes a component library that is used to aid in converting various primitives or nodes in a graphical program into a hardware description, such as a VHDL source file. The following provides two examples of VHDL components in this component library, these being components for a While loop and a multiplier primitive.

1. While Loop Component

The following comprises a VHDL component referred to as whileloop.vhd that the present invention uses when a While loop appears on a graphical program or diagram. Whileloop.vhd shows how a While loop in a graphical program is mapped to a state machine in hardware. It is noted that other control structures such as a "For loop" are similar. Whileloop.vhd is as follows:

```
library ieee;
use ieee.std_logic_1164.all;
entity whileloop is
    port(
        clk,
        enable_in,        -- start loop execution
        clr_enable_out    -- reset loop execution
            : in std_logic;
        diag_enable,      -- start contained diagram execution
        diag_clr_enable_out -- reset contained diagram execution
            : out std_logic;
        diag_done,        -- contained diagram finished
        continue          -- iteration enabled
            : in std_logic;
        enable_out        -- looping complete
            : out std_logic
    );
end whileloop;
architecture rt1 of whileloop is
    type state_t is (idle_st, -- reset state
                     test_st, -- check for loop completion
                     calc_st, -- enable diagram execution
                     end_st   -- assert enable_out
                    );
    signal nstate,state : state_t;
```

```
begin
    process(state,enable_in,clr_enable_out,diag_done,continue)
    begin
        diag_clr_enable_out <= '0';
        diag_enable <= '0';
        enable_out <= '0';
        case state is
            when idle_st =>
                diag_clr_enable_out <= '1';
                if enable_in='1' then
                    nstate <= test_st;
                else
                    nstate <= idle_st;
                end if;
            when test_st =>
                diag_clr_enable_out <= '1';
                if continue='1' then
                    nstate <= calc_st;
                else
                    nstate <= end_st;
                end if;
            when calc_st =>
                diag_enable <= '1';
                if diag_done='1' then
                    nstate <= test_st;
                else
                    nstate <= calc_st;
                end if;
            when end_st =>
                enable_out <= '1';
                nstate <= end_st;
        end case;
        -- Because it appears at the end of the process, this test
        -- overrides any previous assignments to nstate
        if clr_enable_out='1' then
            nstate <= idle_st;
        end if;
    end process;
    process(clk)
    begin
        if clk'event and clk='1' then
            state <= nstate;
        end if;
    end process;
end rt1;
```

2. Multiplier Primitive Component

The following comprises a VHDL component referred to as prim_multiply_16.vhd that the present invention uses when a multiplier primitive appears on a graphical program or diagram. By following the path from enable_in to enable_out, it can be seen how the self-timed logic works—each component asserts enable_out when the data output is valid. Other primitives like "add" or "less than" operate in a similar manner. Prim_multiply_16.vhd is as follows:

```
library ieee;
use ieee.std_logic_1164.all;
entity prim_multiply_16 is
    port(
        clk : in std_logic;
        enable_in : in std_logic;
        clr_enable_out : in std_logic;
        x_y : out std_logic_vector(15 downto 0);
        x : in std_logic_vector(15 downto 0);
        y : in std_logic_vector( 15 downto 0);
        enable_out : out std_logic
        );
end prim_multiply_16;
architecture altera of prim_multiply_16 is
COMPONENT 1pm_mult
    GENERIC (LPM_WIDTHA: POSITIVE;
        LPM_WIDTHB: POSITIVE;
        LPM_WIDTHS: POSITIVE;
        LPM_WIDTHP: POSITIVE;
        LPM_REPRESENTATION: STRING := "UNSIGNED";
        LPM_PIPELINE: INTEGER := 0;
        LPM_TYPE: STRING := "L_MULT"
    );
    PORT (dataa: IN STD_LOGIC_VECTOR(LPM_WLDTHA-1 DOWNTO 0);
        datab: IN STD_LOGIC_VECTOR(LPM_WIDTHB-1 DOWNTO 0);
        aclr: IN STD_LOGIC := '0';
        clock: IN STD_LOGIC := '0';
        sum: IN STD_LOGIC_VECTOR(LPM_WIDTHS-1 DOWNTO 0) :=
(OTHERS => '0');
        result: OUT STD_LOGIC_VECTOR(LPM_WIDTHP-1 DOWNTO 0));
END COMPONENT;
    signal 1_x,1_y : std_logic_vector(15 downto 0);
    signal 1_xy : std_logic_vector(31 downto 0);
    signal 1_enable_in : std_logic;
begin
-- synchronize the incoming and outgoing data to guarantee
-- a registered path on data through the multiplier
-- register enable_out so it won't assert before data is
-- available.
process(clk)
begin
    if clk'event and clk='1' then
```

```
            if clr_enable_out='1' then
                enable_out <= '0';
                1_enable_in <= '0';
            else
                enable_out <= 1_enable_in;
                1_enable_in <= enable_in;
            end if;
        1_x <= x;
        1_y <= y;
        x_y <= 1_xy(15 downto 0);
        end if;
end process;
gainx: 1pm_mult
    GENERIC map(
        LPM_WIDTHA => 16,
        LPM_WIDTHB => 16,
        LPM_WIDTHS => 1,
        LPM_WIDTHP => 32,
        LPM_REPRESENTATION => "UNSIGNED",
        LPM_PIPELINE => 0
        )
    PORT map(
        dataa => 1_x,
        datab => 1_y,
        result => 1_xy
        );
end altera;
```

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A. computer-implemented method for generating a hardware implementation of graphical code, the method comprising:

creating a graphical program, wherein the graphical program includes a plurality of nodes, wherein at least a subset of the plurality of nodes are connected to indicate data flow among the at least a subset of the plurality of nodes, wherein the plurality of nodes includes a structure node, wherein the structure node represents control flow of data among one or more of the plurality of nodes;

generating a hardware description based on the graphical program, wherein the hardware description describes a hardware implementation of the graphical program, wherein said generating includes generating the hardware description based on the structure node;

configuring a programmable hardware element utilizing the hardware description to produce a configured hardware element, wherein the configured hardware element implements a hardware implementation of the graphical program.

2. The method of claim 1, wherein the structure node indicates one of iteration, looping or conditional branching for the one or more of the plurality of nodes in the graphical program.

3. The method of claim 1, wherein the structure node indicates a first portion of the graphical program, wherein the structure node indicates one of iteration, looping or conditional branching for the first portion of the graphical program.

4. The method of claim 1, wherein the structure node contains a first portion of the graphical program, wherein the structure node indicates one of iteration, looping or conditional branching for the first portion of the graphical program.

5. The method of claim 4, wherein the structure node includes an interior portion, wherein nodes comprised in the interior portion of the structure node execute according to control flow as indicated by the structure node;

wherein the first portion of the graphical program is comprised in the structure node.

6. The method of claim 1, wherein said generating includes examining one or more structure node parameters associated with the structure node, wherein said generating uses the one or more structure node parameters in generating the hardware description.

7. The method of claim 6, wherein the structure node is one of an iteration node or a looping node;

wherein the structure node includes at least one of a period parameter and a phase delay parameter, wherein the period parameter indicates a period of execution for cycles of the structure node, and wherein the phase delay parameter indicates a phase delay of cycles of the structure node.

8. The method of claim 1, wherein the structure node is an iteration node, wherein the iteration node indicates iteration of the one or more of the plurality of nodes in the graphical program for a plurality of times;

wherein the iteration node includes an iteration number which indicates a number of iterations for the first portion of the graphical program wherein said generating uses the iteration number in generating the hardware description.

9. The method of claim 1, wherein the structure node is a looping node, wherein the looping node indicates looping of the one or more of the plurality of nodes in the graphical program for a plurality of times;

wherein the looping node includes a loop condition which indicates a number of executions for the first portion of the graphical program wherein said generating uses the loop condition in generating the hardware description.

10. The method of claim 1, wherein said generating the hardware description based on the graphical program comprises converting each of said nodes into a hardware description format;

wherein, for said structure node, said converting comprises:

determining inputs and outputs to/from the structure node;

creating a hardware description of a control block which performs the control function indicated by the structure node;

traversing input dependencies of the node;

creating a hardware description of an AND gate, including listing connections of said input dependencies of the node to said AND gate.

11. The method of claim 1, wherein said generating the hardware description based on the graphical program comprises converting each of said nodes into a hardware description format;

wherein, for said structure node, said converting comprises:

determining inputs and outputs to/from the structure node;

accessing a hardware description of a control block which performs the control function indicated by the structure node from a library of hardware descriptions;

traversing input dependencies of the node;

creating a hardware description of an AND gate, including listing connections of said input dependencies of the node to said AND gate.

12. The method of claim 1, wherein the graphical program implements a measurement function;

wherein the programmable hardware element is comprised in a device;

the method further comprising:

the device acquiring a signal from an external source after said configuring; and the configured hardware element in the device executing to perform the measurement function on the signal.

13. The method of claim 12, wherein the graphical program includes a block diagram and one or more panels, wherein the one or more panels operate as a user interface for the graphical program;

the method further comprising:

storing executable code corresponding to the one or more panels in a memory, wherein the executable code is executable to display the one or more panels on a display;

executing the executable code from the memory to present the one or more panels on the display during the configured hardware element in the device executing to perform the measurement function on the signal.

14. The method of claim 13, wherein the one or more panels are useable for viewing the signal.

15. The method of claim 13, wherein the one or more panels are useable for viewing input to and output from the programmable hardware element.

16. The method of claim 13, wherein the one or more panels are useable for manipulating input to and viewing output from the programmable hardware element.

17. A system which generates a hardware implementation of graphical code, the system comprising:

a computer system comprising a processor and memory, wherein the memory stores a graphical program, wherein the graphical program includes a plurality of nodes, wherein at least a subset of the plurality of nodes are connected to indicate data flow among the at least a subset of the plurality of nodes, wherein the plurality of nodes includes a structure node, wherein the structure node represents control flow of data among one or more of the plurality of nodes; wherein the memory also stores a software program which is executable to generate a hardware description based on at least a portion of the graphical program, wherein the hardware description describes a hardware implementation of the at least a portion of the graphical program, wherein the hardware description includes a hardware description of the structure node;

a device coupled to the computer system, wherein the device includes a programmable hardware element;

wherein the computer system is operable to configure the programmable hardware element utilizing the hardware description to produce a configured hardware element, wherein the configured hardware element implements a hardware implementation of the at least a portion of the graphical program.

18. The system of claim 17, wherein the structure node indicates one of iteration, looping or conditional branching for the one or more of the plurality of nodes in the graphical program.

19. The system of claim 17, wherein the structure node indicates a first portion of the graphical program, wherein the structure node indicates one of iteration, looping or conditional branching for the first portion of the graphical program.

20. The system of claim 17, wherein the structure node contains a first portion of the graphical program, wherein the structure node indicates one of iteration, looping or conditional branching for the first portion of the graphical program.

21. The system of claim 20, wherein the structure node includes an interior portion, wherein nodes comprised in the interior portion of the structure node execute according to control flow as indicated by the structure node;

wherein the first portion of the graphical program is comprised in the structure node.

22. The system of claim 17, wherein the software program is operable to examine one or more structure node parameters associated with the structure node, wherein the software program uses the one or more structure node parameters in generating the hardware description.

23. The system of claim 22, wherein the structure node is one of an iteration node or a looping node;

wherein the structure node includes at least one of a period parameter and a phase delay parameter, wherein the period parameter indicates a period of execution for cycles of the structure node, and wherein the phase delay parameter indicates a phase delay of cycles of the structure node.

24. The system of claim 17, wherein the structure node is an iteration node, wherein the iteration node indicates iteration of the first portion of the graphical program for a plurality of times;
  wherein the iteration node includes an iteration number which indicates a number of iterations for the first portion of the graphical program;
  wherein the software program uses the iteration number in generating the hardware description.

25. The system of claim 17, wherein the structure node is a looping node, wherein the looping node indicates looping of the first portion of the graphical program for a plurality of times;
  wherein the looping node includes a loop condition which indicates a number of executions for the first portion of the graphical program;
  wherein the software program uses the loop condition in generating the hardware description.

26. The system of claim 17,
  wherein the graphical program implements a measurement function;
  wherein the device is operable to acquire a signal from an external source after being configured; and
  wherein the configured hardware element in the device is operable to execute to perform the measurement function on the signal.

27. The system of claim 26,
  wherein the computer system further includes a display;
  wherein the graphical program includes a block diagram and one or more panels, wherein the one or more panels operate as a user interface for the graphical program;
  wherein the memory of the computer system stores executable code corresponding to the one or more panels;
  wherein the processor is operable to execute the executable code from the memory to present the one or more panels on the display during the configured hardware element in the device executing to perform the measurement function on the signal.

28. The system of claim 27,
  wherein the one or more panels are useable for viewing the signal.

29. The system of claim 27,
  wherein the one or more panels are useable for viewing input to and output from the programmable hardware element.

30. The system of claim 27,
  wherein the one or more panels are useable for manipulating input to and viewing output from the programmable hardware element.

31. A. memory medium comprising program instructions for generating a hardware implementation of graphical code, wherein the program instructions are executable to implement:
  creating a graphical program, wherein the graphical program includes a plurality of nodes, wherein at least a subset of the plurality of nodes are connected to indicate data flow among the at least a subset of the plurality of nodes, wherein the plurality of nodes includes a structure node, wherein the structure node represents control flow of data among one or more of the plurality of nodes;
  generating a hardware description based on the graphical program, wherein the hardware description describes a hardware implementation of the graphical program, wherein said generating includes generating a hardware description based on the structure node;
  configuring a programmable hardware element utilizing the hardware description to produce a configured hardware element, wherein the configured hardware element implements a hardware implementation of the graphical program.

32. The memory medium of claim 31,
  wherein the structure node indicates one of iteration, looping or conditional branching for the one or more of the plurality of nodes in the graphical program.

33. The memory medium of claim 31,
  wherein the structure node indicates a first portion of the graphical program, wherein the structure node indicates one of iteration, looping or conditional branching for the first portion of the graphical program.

34. The memory medium of claim 31,
  wherein the structure node contains a first portion of the graphical program, wherein the structure node indicates one of iteration, looping or conditional branching for the first portion of the graphical program.

35. The memory medium of claim 34,
  wherein the structure node includes an interior portion, wherein nodes comprised in the interior portion of the structure node execute according to control flow as indicated by the structure node;
  wherein the first portion of the graphical program is comprised in the structure node.

36. The memory medium of claim 31, wherein said generating includes examining one or more structure node parameters associated with the structure node, wherein said generating uses the one or more structure node parameters in generating the hardware description.

37. The memory medium of claim 36, wherein the structure node is one of an iteration node or a looping node;
  wherein the structure node includes at least one of a period parameter and a phase delay parameter, wherein the period parameter indicates a period of execution for cycles of the structure node, and wherein the phase delay parameter indicates a phase delay of cycles of the structure node.

38. The memory medium of claim 31, wherein the structure node is an iteration node, wherein the iteration node indicates iteration of the one or more of the plurality of nodes in the graphical program for a plurality of times;
  wherein the iteration node includes an iteration number which indicates a number of iterations for the first portion of the graphical program
  wherein said generating uses the iteration number in generating the hardware description.

39. The memory medium of claim 31, wherein the structure node is a looping node, wherein the looping node indicates looping of the one or more of the plurality of nodes in the graphical program for a plurality of times;
  wherein the looping node includes a loop condition which indicates a number of executions for the first portion of the graphical program
  wherein said generating uses the loop condition in generating the hardware description.

40. The memory medium of claim 31, wherein said generating the hardware description based on the graphical program comprises converting each of said nodes into a hardware description format;
  wherein, for said structure node, said converting comprises:

determining inputs and outputs to/from the structure node;

creating a hardware description of a control block which performs the control function indicated by the structure node;

traversing input dependencies of the node;

creating a hardware description of an AND gate, including listing connections of said input dependencies of the node to said AND gate.

41. The memory medium of claim 31, wherein said generating the hardware description based on the graphical program comprises converting each of said nodes into a hardware description format;

wherein, for said structure node, said converting comprises:

determining inputs and outputs to/from the structure node;

accessing a hardware description of a control block which performs the control function indicated by the structure node from a library of hardware descriptions;

traversing input dependencies of the node;

creating a hardware description of an AND gate, including listing connections of said input dependencies of the node to said AND gate.

42. The memory medium of claim 31, wherein the programmable hardware element is comprised in a device;

wherein the graphical program implements a measurement function for measuring a signal acquired by the device from an external source;

wherein the configured hardware element in the device is executable to perform the measurement function on the signal.

43. The memory medium of claim 42, wherein the graphical program includes a block diagram and one or more panels, wherein the one or more panels operate as a user interface for the graphical program;

wherein the program instructions are farther executable to implement:

storing executable code corresponding to the one or more panels in a memory, wherein the executable code is executable to display the one or more panels on a display; and executing the executable code from the memory to present the one or more panels on the display during the configured hardware element in the device executing to perform the measurement function on the signal.

44. The memory medium of claim 43, wherein the one or more panels are useable for viewing the signal.

45. The memory medium of claim 43, wherein the one or more panels are useable for viewing input to and output from the programmable hardware element.

46. The memory medium of claim 43, wherein the one or more panels are useable for manipulating input to and viewing output from the programmable hardware element.

47. A memory medium comprising program instructions for generating a hardware implementation of graphical code, wherein the memory medium stores:

a graphical program, wherein the graphical program includes a plurality of nodes, wherein at least a subset of the plurality of nodes are connected to indicate data flow among the at least a subset of the plurality of nodes, wherein the plurality of nodes includes a structure node, wherein the structure node represents control flow of data among one or more of the plurality of nodes;

a software program for generating a hardware description based on the graphical program, wherein the hardware description describes a hardware implementation of the graphical program, wherein the software program generates the hardware description based on the structure node;

wherein the software program is executable to configure a programmable hardware element utilizing the hardware description to produce a configured hardware element, wherein the configured hardware element implements a hardware implementation of the graphical program.

* * * * *